United States Patent
Luo et al.

(10) Patent No.: US 12,143,999 B2
(45) Date of Patent: Nov. 12, 2024

(54) COMMUNICATION METHOD, APPARATUS, AND SYSTEM

(71) Applicant: HUAWEI TECHNOLOGIES CO., LTD., Guangdong (CN)

(72) Inventors: Zhihu Luo, Beijing (CN); Jun Li, Shanghai (CN); Xingqing Cheng, Beijing (CN); Zhe Jin, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 475 days.

(21) Appl. No.: 17/401,839

(22) Filed: Aug. 13, 2021

(65) Prior Publication Data

US 2021/0378001 A1 Dec. 2, 2021

Related U.S. Application Data

(63) Continuation of application No. PCT/CN2019/075269, filed on Feb. 15, 2019.

(51) Int. Cl.
*H04W 72/23* (2023.01)
*H04L 1/00* (2006.01)
(Continued)

(52) U.S. Cl.
CPC .......... *H04W 72/23* (2023.01); *H04L 1/0004* (2013.01); *H04W 72/1263* (2013.01); *H04W 76/28* (2018.02)

(58) Field of Classification Search
CPC . H04W 72/23; H04W 72/1263; H04W 76/28; H04W 72/21; H04L 1/0004;
(Continued)

(56) References Cited

U.S. PATENT DOCUMENTS

| | | | |
|---|---|---|---|
| 2011/0090825 A1 | 4/2011 | Papasakellariou et al. | |
| 2013/0176981 A1* | 7/2013 | Earnshaw | H04L 1/1835 370/329 |

(Continued)

FOREIGN PATENT DOCUMENTS

| | | |
|---|---|---|
| CN | 101772145 A | 7/2010 |
| CN | 101860424 A | 10/2010 |

(Continued)

OTHER PUBLICATIONS

3GPP TSG RAN WG1 Meeting 95 R1-1813040, 2018.*
(Continued)

*Primary Examiner* — Thai Nguyen
(74) *Attorney, Agent, or Firm* — WOMBLE BOND DICKINSON (US) LLP

(57) ABSTRACT

Embodiments of this application provide a solution for network and terminal devices that have inconsistent understandings of retransmission scheduled by using downlink control information (DCI). The solution includes: A network device sends first DCI to a terminal device, and the terminal device receives the first DCI from the network device, where the first DCI includes a first field and a second field, the first field indicates that a retransmitted transport block (TB) exists in a TB scheduled by using the first DCI, and the second field indicates an index of a retransmitted first TB in the TB scheduled by using the first DCI; and the terminal device receives the retransmitted first TB from the network device based on the first field and the second field; or the terminal device sends the retransmitted first TB to the network device based on the first field and the second field.

20 Claims, 17 Drawing Sheets

(51) Int. Cl.
*H04W 72/1263* (2023.01)
*H04W 76/28* (2018.01)

(58) Field of Classification Search
CPC ... H04L 1/1887; H04L 1/1896; H04L 1/1835; H04L 1/1812; H04L 1/1816
See application file for complete search history.

(56) References Cited

U.S. PATENT DOCUMENTS

| | | | |
|---|---|---|---|
| 2017/0222749 A1* | 8/2017 | Dinan | .................. H04L 5/0051 |
| 2018/0302191 A1 | 10/2018 | Park et al. | |
| 2019/0045554 A1 | 2/2019 | Ye et al. | |

FOREIGN PATENT DOCUMENTS

| | | | | |
|---|---|---|---|---|
| CN | 102404094 | A | 4/2012 | |
| CN | 104618075 | A | 5/2015 | |
| CN | 105790897 | A | 7/2016 | |
| CN | 105978671 | A | 9/2016 | |
| CN | 107294667 | A | 10/2017 | |
| CN | 107409016 | A | 11/2017 | |
| CN | 108282864 | A | 7/2018 | |
| CN | 108631920 | A | 10/2018 | |
| CN | 108631951 | A | 10/2018 | |
| CN | 108633016 | A | 10/2018 | |
| CN | 108924965 | A | 11/2018 | |
| CN | 109075961 | A | 12/2018 | |
| EP | 3416324 | A1 | 12/2018 | |
| KR | 20160079647 | A | 7/2016 | |
| WO | 2018143857 | A1 | 8/2018 | |
| WO | WO-2018169355 | A1 * | 9/2018 | ........... H04L 1/1614 |

OTHER PUBLICATIONS

ERICSSON: "Updated Feature lead summary Scheduling of multiple DL ULtransport", 3GPP Draft; R1-1813759, Nov. 12, 2018-Nov. 16, 2018, 13 pages.

3GPP TSG RAN WG1 Meeting #95,R1-1812135, Scheduling multiple DL/UL transport blocks for SC-PTM and unicast, Huawei, HiSilicon, Spokane, USA, Nov. 12-16, 2018, total 8 pages.

Xie Yunzhou The evolution of NB-IoT standard system and development of Internet of things industry, China NB-IoT Industry Alliance;Mar. 2018, total 12 pages.

Qian Xu:"Performance of PDSCH Channel and HARQ for Broadband Wireless Trunking System",Feb. 15, 2016, total 84 pages.

3GPP TSG RAN WG1 Meeting #95 R1-1812723 NB-IoT Multiple Transport Block Grant Design 6.2.2.3 Scheduling of multiple DL/UL transport blocks Spokane, USA, Nov. 12-16, 2018 total 8 pages.

* cited by examiner

COMMUNICATION METHOD, APPARATUS, AND SYSTEM

CROSS-REFERENCE TO RELATED APPLICATIONS

This application is a continuation of International Application No. PCT/CN2019/075269, filed on Feb. 15, 2019, the disclosure of which is hereby incorporated by reference in its entirety.

TECHNICAL FIELD

This application relates to the communication field, and in particular, to a communication method, apparatus, and system.

BACKGROUND

In a narrowband internet of things (NB-IoT) system earlier than release (Rel) 16, one piece of downlink control information (DCI) is allowed to be used to schedule one TB. Scheduling enhancement is introduced in an NB-IoT system in the Rel-16, so that one piece of DCI is allowed to be used to schedule a plurality of TBs.

To use one piece of DCI to schedule a plurality of TBs, a current technology discloses a downlink discontinuous transmission solution. For example, one piece of DCI is used to schedule two TBs. As shown in (a) and (b) in FIG. 1-1, on a terminal device side, after receiving a TB 1 scheduled by using DCI 1, a terminal device sends a corresponding acknowledgment 1/negative acknowledgment 1 (ACK 1/NACK 1) feedback to a network device; and after sending the ACK 1/NACK 1 feedback, the terminal device monitors DCI 2 within duration. If the terminal device does not detect the DCI 2, the terminal device continues to receive a TB 2; if the terminal device detects the DCI 2, the terminal device receives the retransmitted TB 1 based on the DCI 2. On a network device side, as shown in (a) in FIG. 1-1, after receiving the ACK 1/NACK 1 feedback that corresponds to the TB 1 and that is sent by the terminal device, if the ACK 1/NACK 1 feedback is an ACK 1, the network device continues to send the TB 2 after the duration, and does not need to send the DCI 2, so that DCI overheads can be reduced. Alternatively, as shown in (b) in FIG. 1-1, if the ACK 1/NACK 1 feedback is a NACK 1, the network device sends the DCI 2 to schedule retransmission of the TB 1, and the DCI 2 may be further used to schedule initial transmission of the TB 2.

In addition, to use one piece of DCI to schedule a plurality of TBs, the current technology further discloses an uplink discontinuous transmission solution. For example, one piece of DCI is used to schedule two TBs. As shown in (a) and (b) in FIG. 1-2, on a terminal device side, after sending a TB 1 scheduled by using DCI 1, a terminal device monitors DCI 2 within duration. If the DCI 2 is not detected, the terminal device continues to send a TB 2; if the DCI 2 is detected, the terminal device retransmits the TB 1 based on the DCI 2. On a network device side, as shown in (a) in FIG. 1-2, a network device receives the TB 1 sent by the terminal device. If the TB 1 is correctly received, the network device continues to receive the TB 2 after the duration, and does not need to send the DCI 2 to schedule the TB 2, so that DCI overheads can be reduced. Alternatively, as shown in (b) in FIG. 1-2, the network device receives the TB 1 sent by the terminal device. If the TB 1 fails to be received, the network device sends the DCI 2 to schedule retransmission of the TB 1, and the DCI 2 may be further used to schedule initial transmission of the TB 2.

However, when the downlink discontinuous transmission method and the uplink discontinuous transmission method are applied in the following abnormal scenarios, a network device and a terminal device may have inconsistent understandings of retransmission scheduled by using DCI.

For example, for downlink scheduling, when a terminal device fails to receive a TB 1 scheduled by using DCI 1, the terminal device sends a NACK 1 to a network device, but the network device incorrectly detects the NACK 1 as an ACK 1. In this case, from a perspective of the network device, as shown in (a) in FIG. 1-3, the network device considers that the TB 1 is correctly received by the terminal device, and continues to send a TB 2 after duration. Because the TB 2 cannot be received by the terminal device, the network device sends DCI 2 to schedule retransmission of the TB 2. From a perspective of the terminal device, as shown in (b) in FIG. 1-3, the TB 1 fails to be received, and the terminal device expects retransmission of the TB 1. If the terminal device subsequently receives the DCI 2, and the DCI 2 indicates retransmission, the terminal device considers that the retransmission is the retransmission of the TB 1. It can be learned that in this case, the network device and the terminal device have inconsistent understandings of retransmission scheduled by using the DCI 2.

Alternatively, for example, for uplink scheduling, when a terminal device sends a TB 1 scheduled by using DCI 1, and a network device fails to receive the TB 1, the network device sends DCI 2 to the terminal device to schedule retransmission of the TB 1, but the terminal device does not correctly receive the DCI 2. In this case, from a perspective of the network device, as shown in (a) in FIG. 1-4, the network device does not correctly receive the TB 1, and DCI 3 is subsequently used to schedule retransmission of the TB 1. From a perspective of the terminal device, as shown in (b) in FIG. 1-4, the terminal device does not detect the DCI 2 within duration after sending the TB 1. In this case, the terminal device considers that the TB 1 is successfully transmitted, and continues to send a TB 2. If the terminal device receives the DCI 3, and the DCI 3 indicates retransmission, the terminal device considers that the retransmission is retransmission of the TB 2. It can be learned that in this case, the network device and the terminal device have inconsistent understandings of retransmission scheduled by using the DCI 3.

SUMMARY

Embodiments of this application provide a communication method, apparatus, and system, to resolve a problem, in an existing discontinuous transmission scenario, that a network device and a terminal device have inconsistent understandings of retransmission scheduled by using DCI.

To achieve the foregoing objective, the following technical solutions are used in the embodiments of this application.

According to a first aspect, a communication method and a corresponding communication apparatus are provided. The solution includes: A terminal device receives first downlink control information DCI from a network device, where the first DCI includes a first field and a second field, the first field is used to indicate that a retransmitted TB exists in a transport block TB scheduled by using the first DCI, and the second field is used to indicate an index of a retransmitted first TB in the TB scheduled by using the first DCI; and the terminal device receives the retransmitted first TB from the network device based on the first field and the second field; or the terminal device sends the retransmitted first TB to the network device based on the first field and the second field. Based on this solution, the first DCI sent by the network device to the terminal device includes the index used to indicate the retransmitted first TB in the TB scheduled by using the first DCI. Therefore, after receiving the first DCI, the terminal device may learn that the retransmitted TB scheduled by using the first DCI is the first TB, and then send the retransmitted first TB to the network device. In this way, a problem, in an existing discontinuous transmission scenario, that the network device and the terminal device have inconsistent understandings of retransmission scheduled by using the DCI can be resolved.

In an embodiment, after the terminal device receives the first TB from the network device, the solution further includes: If a buffer of the terminal device stores data of a second TB, the terminal device replaces the data of the second TB in the buffer with data of the first TB. Based on this solution, if the buffer of the terminal device stores the data of the second TB, the terminal device replaces the data of the second TB in the buffer with the data of the first TB. Therefore, an existing receiving failure of the first TB that is caused by a data combination failure in the buffer of the terminal device can be avoided.

In an embodiment, before the terminal device receives the first DCI from the network device, the solution further includes: The terminal device receives second DCI from the network device, where the second DCI is used to schedule the initially transmitted first TB and the initially transmitted second TB; the terminal device receives the initially transmitted second TB from the network device based on the second DCI; and the terminal device sends a negative acknowledgment NACK of the initially transmitted second TB to the network device. Based on this solution, the buffer of the terminal device stores the data of the second TB.

In an embodiment, before the terminal device sends the first TB to the network device, the solution further includes: If a buffer of the terminal device stores data of a second TB, the terminal device clears the data of the second TB in the buffer, and stores data of the first TB into the buffer. Based on this solution, before the terminal device sends the first TB to the network device, if the buffer of the terminal device stores the data of the second TB, the terminal device clears the data of the second TB in the buffer, and stores the data of the first TB into the buffer. Therefore, it can be ensured that the TB sent by the terminal device to the network device is consistent with the TB stored in the buffer of the terminal device.

In an embodiment, before the terminal device receives the first DCI from the network device, the solution further includes: The terminal device receives second DCI from the network device, where the second DCI is used to schedule the initially transmitted first TB and the initially transmitted second TB; the terminal device sends the initially transmitted first TB to the network device based on the second DCI; and If the terminal device receives no DCI within first specified duration, the terminal device sends the initially transmitted second TB to the network device based on the second DCI. Based on this solution, if the network device fails to receive the first TB, a buffer of the network device stores the data of the first TB, and the retransmitted TB sent by the terminal device to the network device is the first TB. Therefore, an existing receiving failure of the first TB that is caused by a data combination failure in the buffer of the network device can be avoided.

In an embodiment, the solution further includes: The terminal device receives indication information from the network device, where the indication information is used to indicate that a plurality of TBs scheduled by using DCI are discontinuously transmitted; and the terminal device determines, based on the indication information, that the initially transmitted first TB and the initially transmitted second TB are discontinuously transmitted. In other words, the network device may explicitly indicate, by using the indication information, whether a plurality of TBs scheduled by using the second DCI are continuously transmitted or discontinuously transmitted, so that indication flexibility can be improved.

In an embodiment, after the terminal device receives the second DCI from the network device, the solution further includes: The terminal device determines, based on a transport block size TBS of the initially transmitted first TB or the initially transmitted second TB, that the initially transmitted first TB and the initially transmitted second TB are discontinuously transmitted; the terminal device determines, based on a modulation and coding scheme MCS domain in the second DCI, that the initially transmitted first TB and the initially transmitted second TB are discontinuously transmitted; or the terminal device determines, based on a resource assignment domain in the second DCI, that the initially transmitted first TB and the initially transmitted second TB are discontinuously transmitted. In other words, the network device may implicitly indicate whether the plurality of TBs scheduled by using the second DCI are continuously transmitted or discontinuously transmitted, so that signaling overheads can be reduced.

According to a second aspect, a communication method and a corresponding communication apparatus are provided. The solution includes: A network device sends first downlink control information DCI to a terminal device, where the first DCI includes a first field and a second field, the first field is used to indicate that a retransmitted TB exists in a transport block TB scheduled by using the first DCI, and the second field is used to indicate an index of a retransmitted first TB in the TB scheduled by using the first DCI; and the network device sends the first TB to the terminal device; or the network device receives the first TB from the terminal device. For technical effects brought by the second aspect, refer to the technical effects brought by the first aspect. Details are not described herein again.

In an embodiment, the first DCI is used for downlink scheduling, and before the network device sends the first DCI to the terminal device, the solution further includes: The network device sends second DCI to the terminal device, where the second DCI is used to schedule the initially transmitted first TB and an initially transmitted second TB; the network device sends the initially transmitted second TB to the terminal device; and the network device receives a negative acknowledgment NACK of the initially transmitted second TB from the terminal device.

In an embodiment, the first DCI is used for uplink scheduling, and before the network device sends the first DCI to the terminal device, the solution further includes: The network device sends second DCI to the terminal device, where the second DCI is used to schedule the initially transmitted first TB and an initially transmitted second TB; the network device receives the initially transmitted first TB from the terminal device; and if the network device sends no DCI to the terminal device within first specified duration, the network device receives the initially transmitted second TB from the terminal device.

In an embodiment, the solution further includes: The network device sends indication information to the terminal device, where the indication information is used to indicate that a plurality of TBs scheduled by using DCI are discontinuously transmitted.

In an embodiment, a transport block size TBS of the initially transmitted first TB or the initially transmitted second TB is used to determine that the initially transmitted first TB and the initially transmitted second TB are discontinuously transmitted; a modulation and coding scheme MCS field in the second DCI is used to determine that the initially transmitted first TB and the initially transmitted second TB are discontinuously transmitted; or a resource assignment field in the second DCI is used to determine that the initially transmitted first TB and the initially transmitted second TB are discontinuously transmitted.

For technical effects brought by any design of the second aspect, refer to the technical effects brought by different designs of the first aspect. Details are not described herein again.

With reference to the first aspect or the second aspect, in an embodiment, the second DCI is used for uplink scheduling, and redundancy versions corresponding to the initially transmitted first TB and the initially transmitted second TB are specified first redundancy versions. In other words, in this solution, the first redundancy version corresponding to the initially transmitted TB is preset.

In an embodiment, the first DCI further includes a third field, and the third field is used to indicate a second redundancy version corresponding to the retransmitted first TB. In other words, in this solution, the second redundancy version corresponding to the retransmitted TB is indicated by the DCI.

With reference to the first aspect or the second aspect, in an embodiment, the second DCI is used for uplink scheduling, redundancy versions corresponding to the initially transmitted first TB and the initially transmitted second TB are specified first redundancy versions, and a redundancy version corresponding to the retransmitted first TB is a specified second redundancy version, where the first redundancy version is different from the second redundancy version. In other words, in this solution, the second redundancy version corresponding to the retransmitted TB and the first redundancy version corresponding to the initially transmitted TB are both preset. In this way, for a DCI design, a 1-bit RV field may be further saved.

According to a third aspect, a communication method and a corresponding communication apparatus are provided. The solution includes: A terminal device receives first downlink control information DCI from a network device, where the first DCI is used to schedule a first transport block TB and a second TB; the terminal device receives the first TB from the network device based on the first DCI; the terminal device sends a negative acknowledgment NACK of the first TB to the network device; and if the terminal device does not receive second DCI within first specified duration, the terminal device receives the second TB. Based on this solution, the network device sends, to the terminal device, the first DCI used to schedule the first TB and the second TB. After the network device sends the first TB to the terminal device, if the first TB fails to be received, and the terminal device does not receive the second DCI within the first specified duration, the terminal device may consider that an NDI bit is toggled. The network device continues to send the second TB to the terminal device, and the terminal device receives the second TB from the network device. Therefore, a problem, in an existing discontinuous transmission scenario, that the network device and the terminal device have inconsistent understandings of retransmission scheduled by using the DCI can be resolved.

In an embodiment, the solution further includes: If the terminal device does not receive the second DCI within the first specified duration, the terminal device clears data of the first TB in a buffer of the terminal device. Based on this solution, if the terminal device does not receive the second DCI within the first specified duration, the terminal device clears the data of the first TB in the buffer of the terminal device. Therefore, an existing receiving failure of the second TB that is caused by a data combination failure in the buffer of the terminal device can be avoided.

In an embodiment, the solution further includes: The terminal device receives indication information from the network device, where the indication information is used to indicate that a plurality of TBs scheduled by using DCI are discontinuously transmitted; and the terminal device determines, based on the indication information, that the first TB and the second TB that are scheduled by using the first DCI are discontinuously transmitted. In other words, the network device may explicitly indicate, by using the indication information, whether a plurality of TBs scheduled by using the first DCI are continuously transmitted or discontinuously transmitted.

In an embodiment, after the terminal device receives the first DCI from the network device, the solution further includes: The terminal device determines, based on a transport block size TBS of the first TB or the second TB scheduled by using the first DCI, that the first TB and the second TB that are scheduled by using the first DCI are discontinuously transmitted; the terminal device determines, based on a modulation and coding scheme MCS domain in the first DCI, that the first TB and the second TB that are scheduled by using the first DCI are discontinuously transmitted; or the terminal device determines, based on a resource assignment domain in the first DCI, that the first TB and the second TB that are scheduled by using the first DCI are discontinuously transmitted. In other words, the network device may implicitly indicate whether the plurality of TBs scheduled by using the first DCI are continuously transmitted or discontinuously transmitted.

According to a fourth aspect, a communication method and a corresponding communication apparatus are provided. The solution includes: A terminal device receives indication information from a network device, where the indication information is used to indicate that a plurality of TBs scheduled by using downlink control information DCI are discontinuously transmitted; and the terminal device determines, based on the indication information, that the plurality of TBs scheduled by using the DCI are discontinuously transmitted. In other words, the network device may explicitly indicate, by using the indication information, whether the plurality of TBs scheduled by using the DCI are continuously transmitted or discontinuously transmitted, so that indication flexibility can be improved.

According to a fifth aspect, a communication method and a corresponding communication apparatus are provided. The solution includes: A network device sends indication information to a terminal device, where the indication information is used to indicate that a plurality of TBs scheduled by using downlink control information DCI are discontinuously transmitted. In other words, the network device may explicitly indicate, by using the indication information, whether the plurality of TBs scheduled by using the DCI are continuously transmitted or discontinuously transmitted, so that indication flexibility can be improved.

According to a sixth aspect, a communication method and a corresponding communication apparatus are provided. The solution includes: A terminal device receives downlink control information DCI from a network device, where the DCI is used to schedule a plurality of transport blocks TBs; and the terminal device determines, based on a transport block size TBS scheduled by using the DCI, whether the plurality of TBs are continuously transmitted or discontinuously transmitted; the terminal device determines, based on a resource assignment field in the DCI, whether the plurality of TBs are continuously transmitted or discontinuously transmitted; or the terminal device determines, based on a modulation and coding scheme MCS field in the DCI, whether the plurality of TBs are continuously transmitted or discontinuously transmitted. In other words, the network device may implicitly indicate whether the plurality of TBs scheduled by using the DCI are continuously transmitted or discontinuously transmitted, so that signaling overheads can be reduced.

According to a seventh aspect, a communication method and a corresponding communication apparatus are provided. The solution includes: A network device sends downlink control information DCI to a terminal device, where the DCI is used to schedule a plurality of transport blocks TBs; and a transport block size TBS of one of a plurality of transport blocks is used to determine whether the plurality of TBs are continuously transmitted or discontinuously transmitted; a resource assignment field in the DCI is used to determine whether the plurality of TBs are continuously transmitted or discontinuously transmitted; or a modulation and coding scheme MCS field in the DCI is used to determine whether the plurality of TBs are continuously transmitted or discontinuously transmitted. In other words, the network device may implicitly indicate whether the plurality of TBs scheduled by using the DCI are continuously transmitted or discontinuously transmitted, so that signaling overheads can be reduced.

According to an eighth aspect, a communication apparatus is provided, to implement the foregoing methods. The communication apparatus may be the terminal device in the first aspect, the third aspect, the fourth aspect, or the sixth aspect, or an apparatus including the terminal device. Alternatively, the communication apparatus may be the network device in the second aspect, the fifth aspect, or the seventh aspect, or an apparatus including the network device. The communication apparatus includes a corresponding module, unit, or means (means) for implementing the foregoing method. The module, unit, or means may be implemented by hardware, software, or hardware executing corresponding software. The hardware or the software includes one or more modules or units corresponding to the foregoing functions.

According to a ninth aspect, a communication apparatus is provided. The communication apparatus includes a processor and a memory. The memory is configured to store computer instructions; and when the processor executes the instructions, the communication apparatus is enabled to perform the method according to any one of the foregoing aspects. The communication apparatus may be the terminal device in the first aspect, the third aspect, the fourth aspect, or the sixth aspect, or an apparatus including the terminal device. Alternatively, the communication apparatus may be the network device in the second aspect, the fifth aspect, or the seventh aspect, or an apparatus including the network device.

According to a tenth aspect, a communication apparatus is provided. The communication apparatus includes a processor. The processor is configured to: be coupled to a memory; and after reading instructions in the memory, perform the method according to any one of the foregoing aspects based on the instructions. The communication apparatus may be the terminal device in the first aspect, the third aspect, the fourth aspect, or the sixth aspect, or an apparatus including the terminal device. Alternatively, the communication apparatus may be the network device in the second aspect, the fifth aspect, or the seventh aspect, or an apparatus including the network device.

According to an eleventh aspect, a computer-readable storage medium is provided. The computer-readable storage medium stores instructions; and when the instructions are run on a computer, the computer is enabled to perform the method according to any one of the foregoing aspects.

According to a twelfth aspect, a computer program product including instructions is provided. When the computer program product runs on a computer, the computer is enabled to perform the method according to any one of the foregoing aspects.

According to a thirteenth aspect, a communication apparatus (where for example, the communication apparatus may be a chip or a chip system) is provided. The communication apparatus includes a processor, configured to implement the function in any one of the foregoing aspects. In an embodiment, the communication apparatus further includes a memory. The memory is configured to store program instructions and data that are necessary. When the communication apparatus is a chip system, the communication apparatus may include a chip, or may include a chip and another discrete component.

For technical effects brought by any design of the eighth aspect to the thirteenth aspect, refer to technical effects brought by different designs of the first aspect to the seventh aspect. Details are not described herein again.

According to a thirteenth aspect, a communication system is provided. The communication system includes the terminal device and the network device according to the foregoing aspects, or the communication system includes a network device and the terminal device according to the foregoing aspects.

BRIEF DESCRIPTION OF DRAWINGS

FIG. 1-2 is a second schematic diagram of existing discontinuous transmission scheduling according to an embodiment of the application;

FIG. 1-3 is a second schematic diagram of existing discontinuous transmission scheduling according to an embodiment of the application;

FIG. 1-4 is a fourth schematic diagram of existing discontinuous transmission scheduling according to an embodiment of the application;

FIG. 2 is a schematic architectural diagram of a communication system according to an embodiment of this application;

FIG. 3 is a schematic structural diagram of a terminal device and a network device according to an embodiment of this application;

FIG. 4 is another schematic structural diagram of a terminal device according to an embodiment of this application;

DETAILED DESCRIPTION OF EMBODIMENTS

Figure 1:
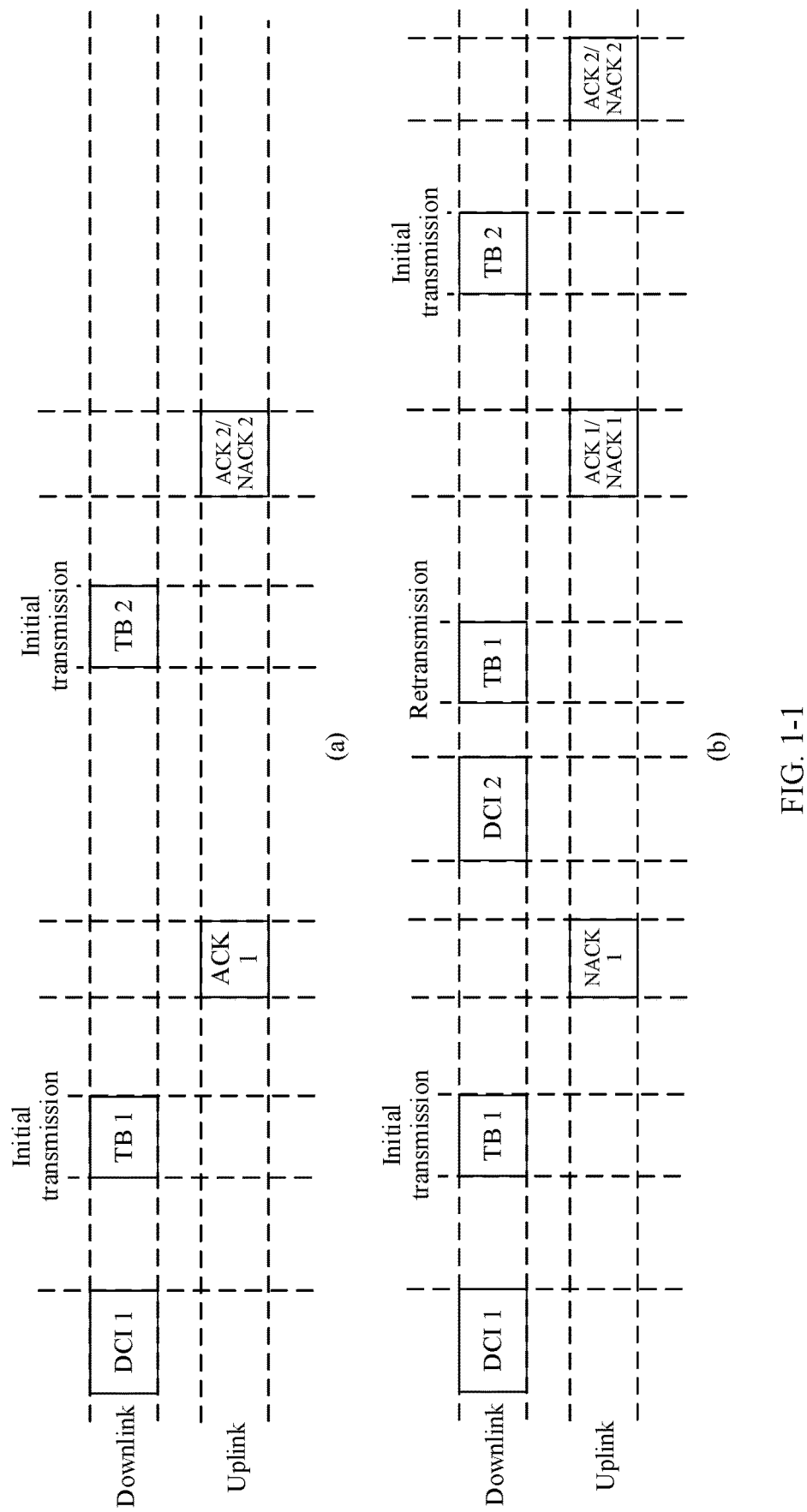
FIG. 1-1 is a first schematic diagram of existing discontinuous transmission scheduling according to an embodiment of the application.

For ease of understanding of technical solutions in embodiments of this application, the following first briefly describes technologies or nouns related to this application.

1. IoT:

The IoT is an "internet in which things are interconnected". Through the IoT, a user end of the internet is extended to any object, so that information exchange and communication can be performed between any objects. Such a communication manner is also referred to as machine type communication (MTC). A communication node is referred to as an MTC terminal or an MTC device. Typical IoT applications include a smart grid, smart agriculture, smart transportation, smart household, environment detection, and the like.

The internet of things needs to be applied to a plurality of scenarios, for example, from outdoor to indoor, and from overground to underground. Therefore, many special requirements are imposed on a design of the internet of things. For example, an MTC terminal in some scenarios is used in an environment with poor coverage. For example, a water meter or an electricity meter is usually installed in a place where a wireless network signal is very poor, for example, is installed indoors or even in a basement. Therefore, a coverage enhancement technology is required to resolve this problem. Alternatively, a quantity of MTC terminals in some scenarios is far greater than a quantity of devices for human-to-human communication, that is, large-scale deployment is required. Therefore, an MTC terminal needs to be obtained and used at very low costs. Alternatively, a data packet transmitted by an MTC terminal in some scenarios is very small, and is delay-insensitive. Therefore, an MTC terminal with a low rate needs to be supported. Alternatively, in most cases, an MTC terminal is powered by using a battery. However, in many scenarios, the MTC terminal needs to be used for more than 10 years without replacing the battery. Therefore, the MTC terminal needs to work with extremely low power consumption.

To satisfy the foregoing requirements, the mobile communication standards organization 3GPP adopted a new research project at the RAN #62 conference to study a method for supporting an internet of things with extremely low complexity and low costs in a cellular network, and initiated an NB-IoT project at the RAN #69 conference.

2. Hybrid Automatic Repeat Request (Hybrid Automatic Repeat Request, HARQ):

The HARQ is a technology in which forward error correction (FEC) and automatic repeat request (ARQ) methods are combined. In the FEC, redundant information is added to enable a receive end to correct some errors, thereby reducing a quantity of retransmissions. For an error that cannot be corrected through the FEC, the receive end requests, in an ARQ mechanism, a transmit end to retransmit a TB. The receive end uses an error-detection code, namely, a cyclic redundancy check (CRC), to detect whether an error occurs in the received TB. If no error is detected by the receive end, the receive end sends an ACK to the transmit end; and after receiving the ACK, the transmit end sends a next TB. Alternatively, if the receive end detects an error, the receive end sends a negative acknowledgment (NACK) to the transmit end; and after receiving the NACK, the transmit end resends the previous TB to the receive end.

A HARQ protocol exists at both the transmit end and the receive end. HARQ operations of the transmit end include sending and retransmission of a TB, receiving and processing of an ACK or a NACK, and the like. HARQ operations of the receive end include receiving of a TB, generation of an ACK or a NACK, and the like.

In addition, the HARQ is classified into an uplink HARQ and a downlink HARQ. The downlink HARQ is for a TB carried on a downlink shared channel (DL-SCH), and the uplink HARQ is for a TB carried on an uplink shared channel (uplink shared channel, DL-SCH). For example, the uplink HARQ is a processing procedure of acknowledging and retransmitting a TB sent by a terminal device to a network device. The downlink HARQ is a processing procedure of acknowledging and retransmitting a TB sent by a network device to a terminal device. A communication method provided in the embodiments of this application mainly relates to the downlink HARQ.

3. DCI Format:

In an NB-IoT system earlier than the Rel-16, one piece of DCI is allowed to be used to schedule one TB. A DCI format used for uplink scheduling is a DCI format N0. For a single HARQ process (a single HARQ for short below), content and a quantity of bits of the DCI format N0 are shown in Table 1. A 1-bit flag for format N0/format N1 differentiation field (which may also be referred to as a domain) is used to indicate whether a format of DCI is the format N0 or a format N1. A 6-bit subcarrier indication field is used to indicate a frequency domain resource location. A 3-bit resource assignment field is used to indicate scheduling resource assignment. A 2-bit scheduling delay field is used to determine duration from an end moment of transmission of the DCI to a start moment of transmission of a narrowband physical uplink shared channel (NPUSCH) corresponding to a TB scheduled by using the DCI. A 4-bit modulation and coding scheme (MCS) field is used to indicate a modulation order. A 1-bit redundancy version (RV) field is used to indicate an RV corresponding to the TB scheduled by using the DCI. A 3-bit repetition number field is used to indicate a quantity of retransmissions of the TB scheduled by using the DCI. A 1-bit new data indicator (NDI) field is used to indicate whether currently scheduled transmission is initial transmission or retransmission. A 2-bit DCI repetition number field is used to indicate a quantity of DCI repetitions.

TABLE 1

| Content | Quantity of bits [bits] |
|---|---|
| Flag for format N0/format N1 differentiation | 1 |
| Subcarrier indication | 6 |
| Resource assignment | 3 |
| Scheduling delay | 2 |
| MCS | 4 |
| RV | 1 |
| Repetition number | 3 |
| NDI | 1 |
| DCI repetition number | 2 |

A DCI format used for downlink scheduling is the DCI format N1. For a single HARQ, content and a quantity of bits of the DCI format N1 are shown in Table 2. A 1-bit flag for format N0/format N1 differentiation field is used to indicate whether a format of DCI is the format N0 or the format N1. A 1-bit narrowband physical downlink control channel (NPDCCH) field is used to indicate whether current DCI scheduling is random access triggered by an NPDCCH order. A 3-bit scheduling delay field is used to determine duration from an end moment of transmission of the DCI to a start moment of transmission of a narrowband physical downlink shared channel (NPDSCH) corresponding to a TB scheduled by using the DCI. A 3-bit resource assignment field is used to indicate scheduling resource assignment. A 4-bit MCS field is used to indicate a modulation order. A 4-bit repetition number field is used to indicate a quantity of retransmissions of the TB scheduled by using the DCI. A 1-bit NDI field is used to indicate whether currently scheduled transmission is initial transmission or retransmission. A 4-bit HARQ-ACK resource field is used to indicate a resource location for HARQ feedback transmission. A 2-bit DCI repetition number field is used to indicate a quantity of DCI repetitions.

TABLE 2

| Content | Quantity of bits [bits] |
|---|---|
| Flag for format N0/format N1 differentiation | 1 |
| NPDCCH order indicator | 1 |
| Scheduling delay | 3 |
| Resource assignment | 3 |
| MCS | 4 |
| Repetition number | 4 |
| NDI | 1 |
| HARQ-ACK resource | 4 |
| DCI repetition number | 2 |

For a single HARQ, only one piece of DCI in the DCI format N0 is required for uplink scheduling, and also only one piece of DCI in the DCI format N1 is required for downlink scheduling. Each DCI is used to schedule only one TB. For two HARQ processes (two HARQs for short below), when two HARQs are used, two pieces of DCI in the DCI format N0 are required for uplink scheduling, and two pieces of DCI in the DCI format N1 are required for downlink scheduling. Similarly, each DCI is used to schedule only one TB. In addition, each DCI further includes a 1-bit HARQ process number field, used to indicate a HARQ process identifier.

However, scheduling enhancement is introduced in an NB-IoT system in the Rel-16, and one piece of DCI is allowed to be used to schedule a plurality of TBs. Therefore, scheduling information of the plurality of TBs needs to be carried in the DCI, and the foregoing DCI formats used in the NB-IoT system earlier than the Rel-16 are not applicable. The communication method provided in the embodiments of this application mainly relates to a single HARQ.

The following describes the technical solutions in the embodiments of this application with reference to the accompanying drawings in the embodiments of this application. In the descriptions of this application, "/" represents an "or" relationship between associated objects unless otherwise specified. For example, A/B may represent A or B. The term "and/or" in this application indicates only an association relationship for describing associated objects and indicates that three relationships may exist. For example, A and/or B may indicate the following three cases: Only A exists, both A and B exist, and only B exists, where A and B may be singular or plural. In addition, in the descriptions of this application, "a plurality of" means two or more than two unless otherwise specified. "At least one item (piece) of the following" or a similar expression thereof represent any combination of these items, including one item (piece) or any combination of a plurality of items (pieces). For example, at least one of a, b, or c may indicate: a, b, c, a and b, a and c, b and c, or a, b, and c, where a, b, and c may be singular or plural. In addition, to clearly describe the technical solutions in the embodiments of this application, terms such as "first" and "second" are used in the embodiments of this application to distinguish between same items or similar items that have basically same functions and purposes. One of ordinary skilled in the art may understand that the terms such as "first" and "second" do not limit a quantity or an execution sequence, and the terms such as "first" and "second" do not indicate a definite difference. In addition, in the embodiments of this application, the term such as "example" or "for example" is used to represent giving an example, an illustration, or a description. Any embodiment or design scheme described as an "example" or "for example" in the embodiments of this application should not be explained as being preferable or having more advantages than another embodiment or design scheme. Exactly, use of the term such as "example" or "for example" is intended to present a relative concept in a manner for ease of understanding.

The embodiments of this application are applicable to an LTE system such as an NB-IoT system, or are applicable to another wireless communication system, such as a global system for mobile communications (GSM), a mobile communication system (UMTS), a code division multiple access (CDMA) system, a wideband code division multiple access (WCDMA) system, or a new future-oriented network device system. This is not limited in the embodiments of this application. The foregoing communication systems applicable to this application are merely examples for description, and communication systems applicable to this application are not limited thereto. A general description is provided herein, and details are not described below. In addition, the terms "system" and "network" may be interchanged.

Figures 1, 2:
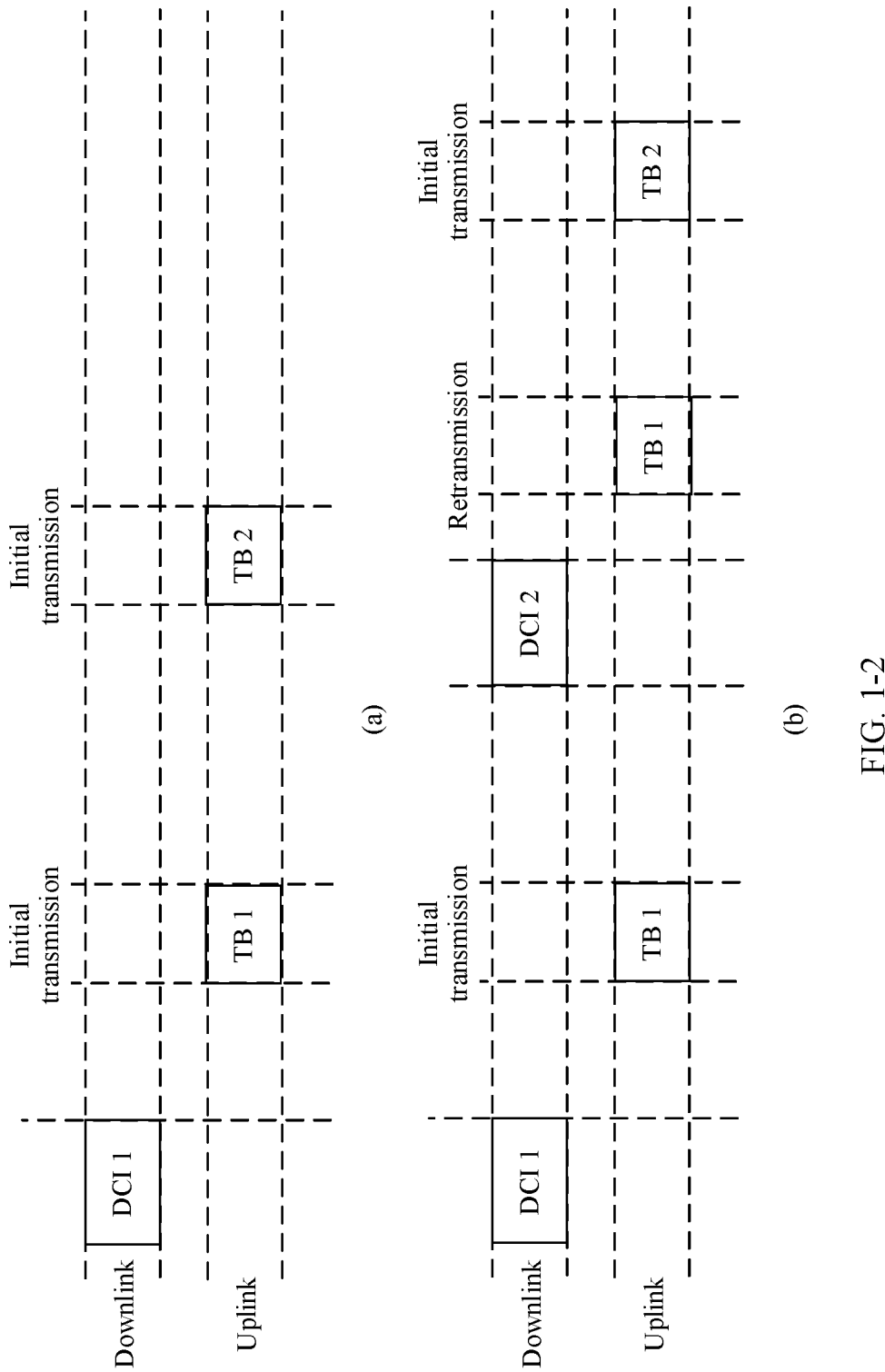

FIG. 2 shows a communication system 20 according to an embodiment of this application. The communication system 20 includes a network device 30 and one or more terminal devices 40 connected to the network device 30. In an embodiment, different terminal devices 40 may communicate with each other.

For example, as shown in FIG. 2, the network device 30 interacts with any terminal device 40, and scheduling is downlink scheduling. In an embodiment of the application, the network device 30 sends first DCI to the terminal device, where the first DCI includes a first field and a second field, the first field is used to indicate that a retransmitted TB exists in a TB scheduled by using the first DCI, and the second field is used to indicate an index of a retransmitted first TB in the TB scheduled by using the first DCI. The network device 30 sends the retransmitted first TB to the terminal device 40. After receiving the first DCI from the network device 30, the terminal device 40 receives the retransmitted first TB from the network device 30 based on the first field and the second field. An embodiment of this solution is described in detail in a subsequent method embodiment. Details are not described herein. Based on this solution, the first DCI sent by the network device to the terminal device includes the index used to indicate the retransmitted first TB in the TB scheduled by using the first DCI. Therefore, after receiving the first DCI, the terminal device may learn that the retransmitted TB scheduled by using the first DCI is the first TB, and then receive the retransmitted first TB from the network device based on the first DCI. In this way, a problem, in an existing discontinuous transmission scenario, that the network device and the terminal device have inconsistent understandings of retransmission scheduled by using the DCI can be resolved.

Alternatively, for example, as shown in FIG. 2, the network device 30 interacts with any terminal device 40, and scheduling is uplink scheduling. In an embodiment of the application, the network device 30 sends first DCI to the terminal device, where the first DCI includes a first field and a second field, the first field is used to indicate that a retransmitted TB exists in a TB scheduled by using the first DCI, and the second field is used to indicate an index of a retransmitted first TB in the TB scheduled by using the first DCI. After receiving the first DCI from the network device 30, the terminal device 40 sends the retransmitted first TB to the network device 30 based on the first field and the second field. The network device 30 receives the retransmitted first TB from the terminal device 40. An embodiment of this solution is described in detail in a subsequent method embodiment. Details are not described herein. Based on this solution, the first DCI sent by the network device to the terminal device includes the index used to indicate the retransmitted first TB in the TB scheduled by using the first DCI. Therefore, after receiving the first DCI, the terminal device may learn that the retransmitted TB scheduled by using the first DCI is the first TB, and then send the retransmitted first TB to the network device. In this way, a problem, in an existing discontinuous transmission scenario, that the network device and the terminal device have inconsistent understandings of retransmission scheduled by using the DCI can be resolved.

It should be noted that in the embodiments of this application, for a downlink, receiving or sending a TB scheduled by using DCI may also be understood as receiving or sending a downlink channel carrying the TB scheduled by using the DCI, where the downlink channel may be, for example, an NPDSCH. For an uplink, receiving or sending a TB scheduled by using DCI may also be understood as receiving or sending an uplink channel carrying the TB scheduled by using the DCI, where the uplink channel may be, for example, an NPUSCH. A general description is provided herein, and details are not described below.

It should be noted that the DCI in the embodiments of this application also supports scheduling of one TB. When the DCI is used to schedule one TB, a scheduling manner in a current technology may be used. A general description is provided herein, and details are not described below.

For example, the network device 30 in an embodiment of the application is a device for connecting the terminal device 40 to a wireless network, and may be an evolved NodeB (evolutional NodeB, eNB or eNodeB) in long term evolution (LTE), a base transceiver station (BTS) in GSM or CDMA, a NodeB in a WCDMA system, a base station in a 5th generation (5G) network or a future evolved public land mobile network (PLMN), a broadband network gateway (BNG), an aggregation switch, a non-3rd generation partnership project (3GPP) access device, or the like. This is not limited in an embodiment of the application. For example, the base station in an embodiment of the application may include base stations in various forms, for example, a macro base station, a micro base station (which is also referred to as a small cell), a relay station, and an access point. This is not limited in an embodiment of the application.

For example, the terminal device 40 in an embodiment of the application may be a device, such as a terminal or a chip that may be used in the terminal, configured to implement a wireless communication function. The terminal may be user equipment (UE), an access terminal, a terminal unit, a terminal station, a mobile station, a mobile console, a remote station, a remote terminal, a mobile device, a wireless communication device, a terminal agent, a terminal apparatus, or the like in a 5G network or a future evolved PLMN. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. The terminal may be mobile or in a fixed position.

For example, the network device 30 and the terminal device 40 in an embodiment of the application may also be referred to as communication apparatuses, and each may be a general-purpose device or a dedicated device. This is not limited in an embodiment of the application.

Figures 1, 2, 3:
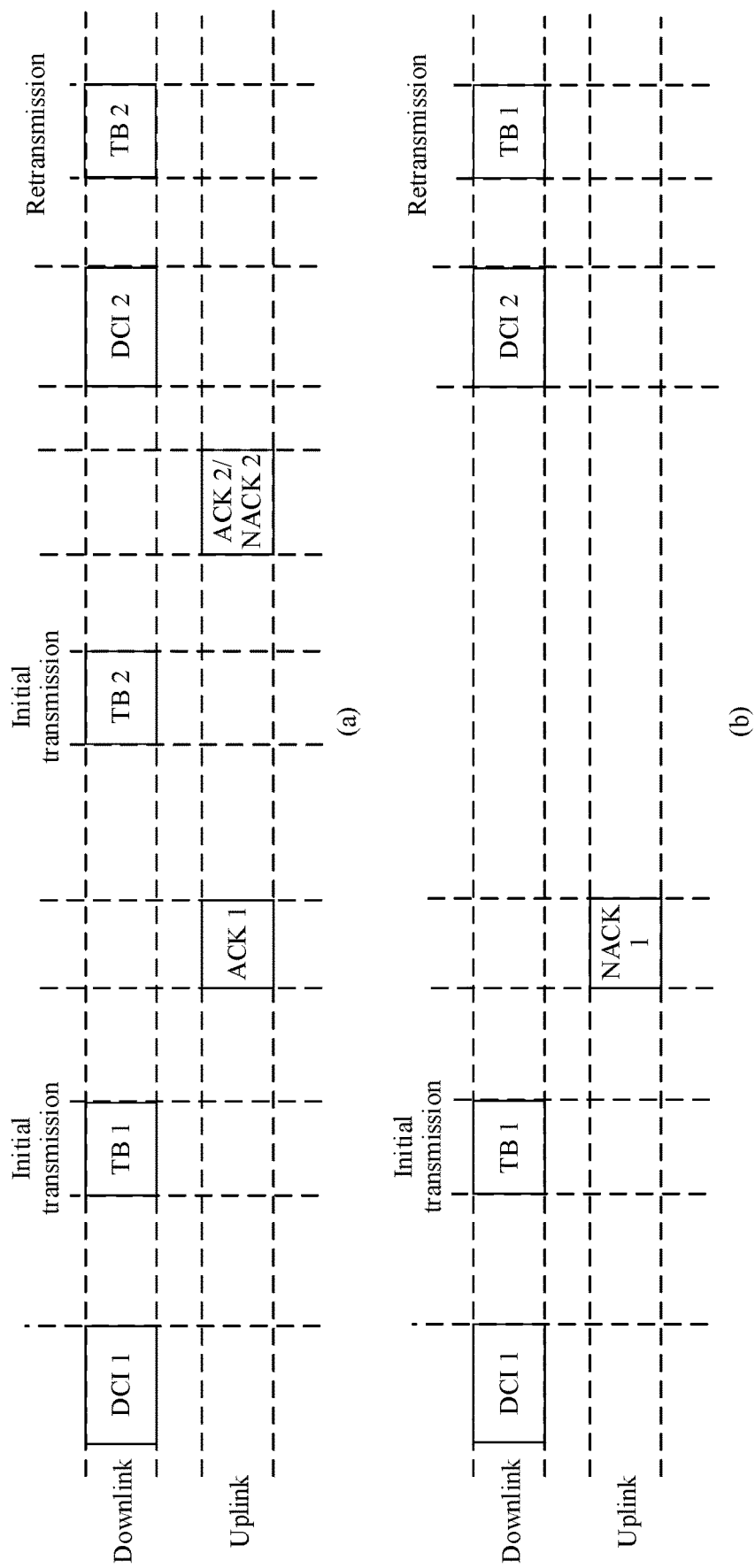

In an embodiment, FIG. 3 is a schematic structural diagram of the network device 30 and the terminal device 40 according to an embodiment of this application.

The terminal device 40 includes at least one processor (an example in which the terminal device 40 includes one processor 401 is used for description in FIG. 3) and at least one transceiver (an example in which the terminal device 40 includes one transceiver 403 is used for description in FIG. 3). In an embodiment, the terminal device 40 may further include at least one memory (an example in which the terminal device 40 includes one memory 402 is used for description in FIG. 3), at least one output device (an example in which the terminal device 40 includes one output device 404 is used for description in FIG. 3), and at least one input device (an example in which the terminal device 40 includes one input device 405 is used for description in FIG. 3).

The processor 401, the memory 402, and the transceiver 403 are connected by using a communication line. The communication line may include a path transmitting information between the foregoing components.

The processor 401 may be a general-purpose central processing unit (CPU), a microprocessor, an application-specific integrated circuit (ASIC), or one or more integrated circuits configured to control program execution of the solutions in this application. In an embodiment, the processor 401 may also include a plurality of CPUs, and the processor 401 may be a single-core (single-CPU) processor or a multi-core (multi-CPU) processor. The processor herein may refer to one or more devices, circuits, or processing cores configured to process data (for example, computer program instructions).

The memory 402 may be an apparatus having a storage function. For example, the memory 402 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other computer-accessible medium that can be used to carry or store expected program code in an instruction form or a data structure form, but is not limited thereto. The memory 402 may exist independently, and is connected to the processor 401 by using the communication line. Alternatively, the memory 402 may be integrated with the processor 401.

The memory 402 is configured to store computer-executable instructions for performing the solutions in this application, and the processor 401 controls the execution. For example, the processor 401 is configured to execute the computer-executable instructions stored in the memory 402, to implement the communication method in the embodiments of this application.

Alternatively, for example, in an embodiment of the application, the processor 401 may perform processing-related functions in the communication method provided in the following embodiments of this application. The transceiver 403 is responsible for communicating with another device or a communication network. This is not limited in an embodiment of the application.

For example, the computer-executable instructions in an embodiment of the application may also be referred to as application program code or computer program code. This is not limited in an embodiment of the application.

The transceiver 403 may be any type of apparatus using a transceiver, and is configured to communicate with another device or a communication network such as the Ethernet, a radio access network (RAN), or a wireless local area network (WLAN). The transceiver 403 includes a transmitter (Tx) and a receiver (Rx).

The output device 404 communicates with the processor 401, and may display information in a plurality of manners. For example, the output device 404 may be a liquid crystal display (LCD), a light emitting diode (LED) display device, a cathode ray tube (CRT) display device, or a projector (projector).

The input device 405 communicates with the processor 401, and may receive an input of a user in a plurality of manners. For example, the input device 405 may be a mouse, a keyboard, a touchscreen device, or a sensing device.

The network device 30 includes at least one processor (an example in which the network device 30 includes one processor 301 is used for description in FIG. 3), at least one transceiver (an example in which the network device 30 includes one transceiver 303 is used for description in FIG. 3), and at least one network interface (an example in which the network device 30 includes one network interface 304 is used for description in FIG. 3). For example, the network device 30 may further include at least one memory (an example in which the network device 30 includes one memory 302 is used for description in FIG. 3). The processor 301, the memory 302, the transceiver 303, and the network interface 304 are connected by using a communication line. The network interface 304 is configured to: connect to a core network device through a link (for example, an S1 interface), or connect to a network interface of another network device through a wired or wireless link (for example, an X2 interface) (not shown in FIG. 3). This is not limited in an embodiment of the application. In addition, for related descriptions of the processor 301, the memory 302, and the transceiver 303, refer to descriptions of the processor 401, the memory 402, and the transceiver 403 in the terminal device 40. Details are not described herein again.

Figures 1, 2, 3, 4:
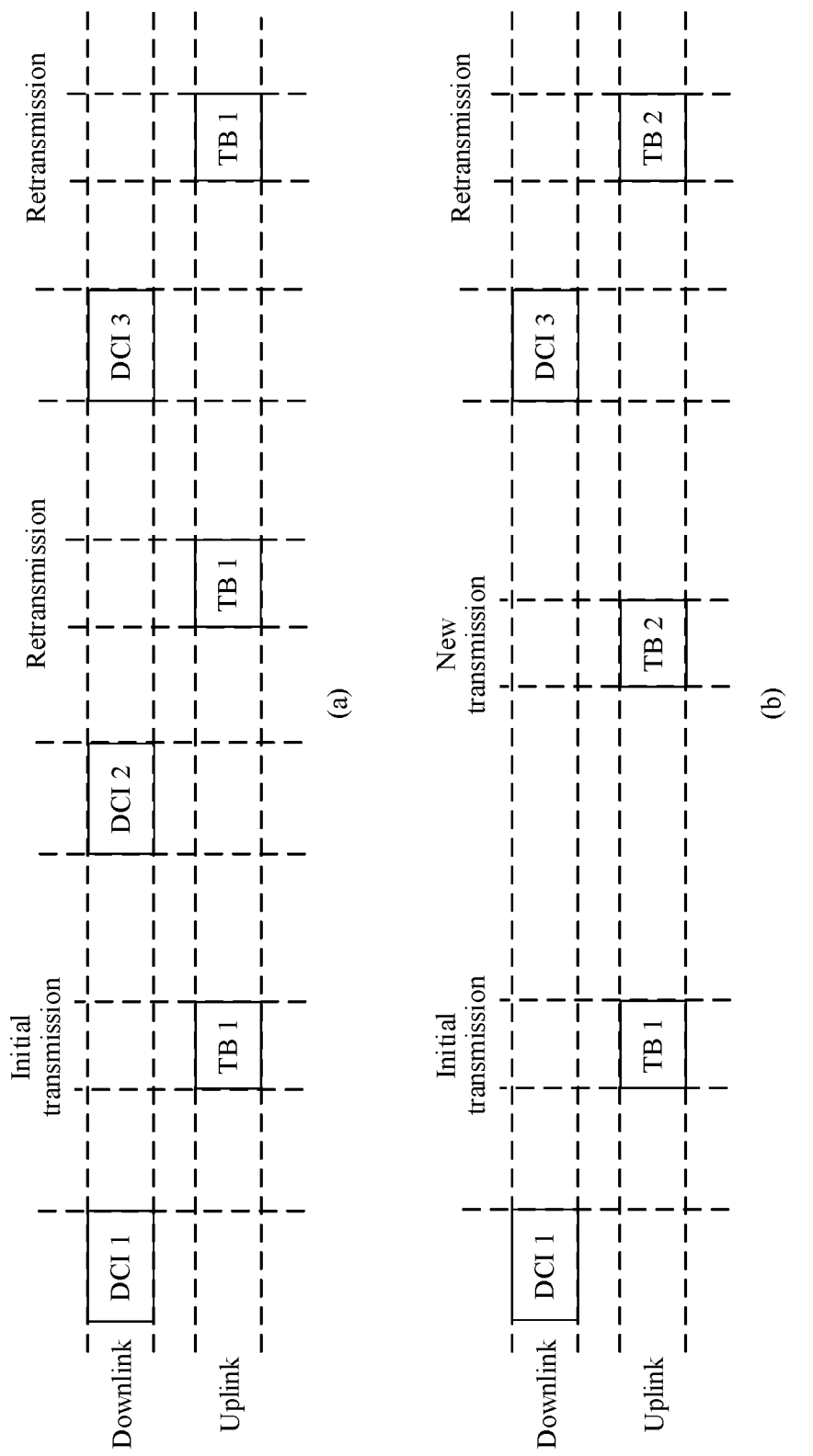
Figure 2:
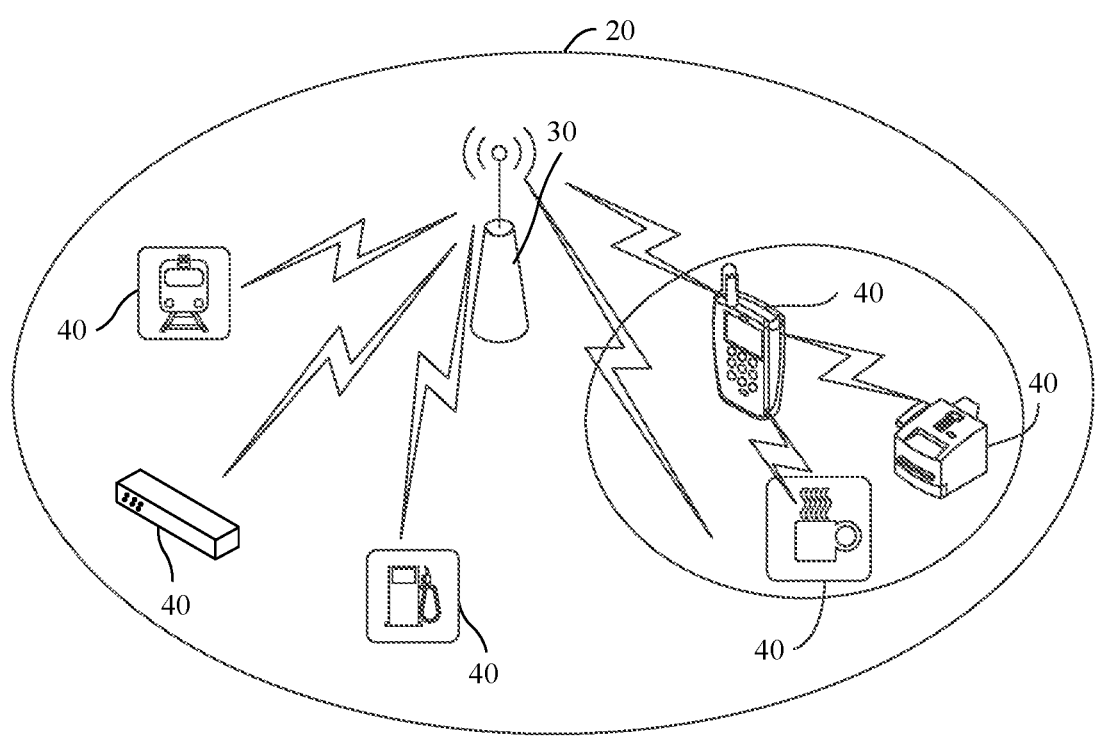
Figure 3:
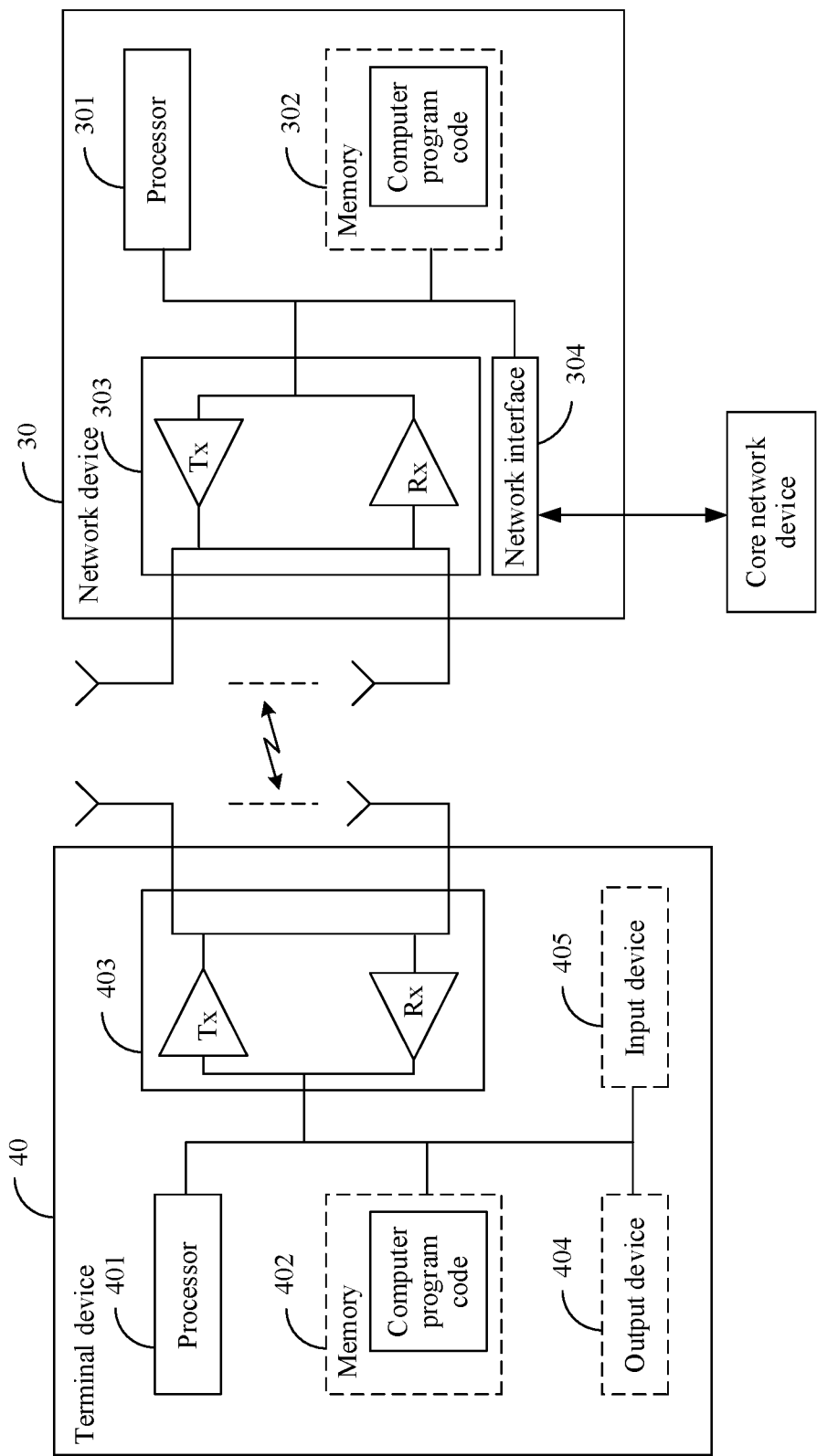
Figure 4:
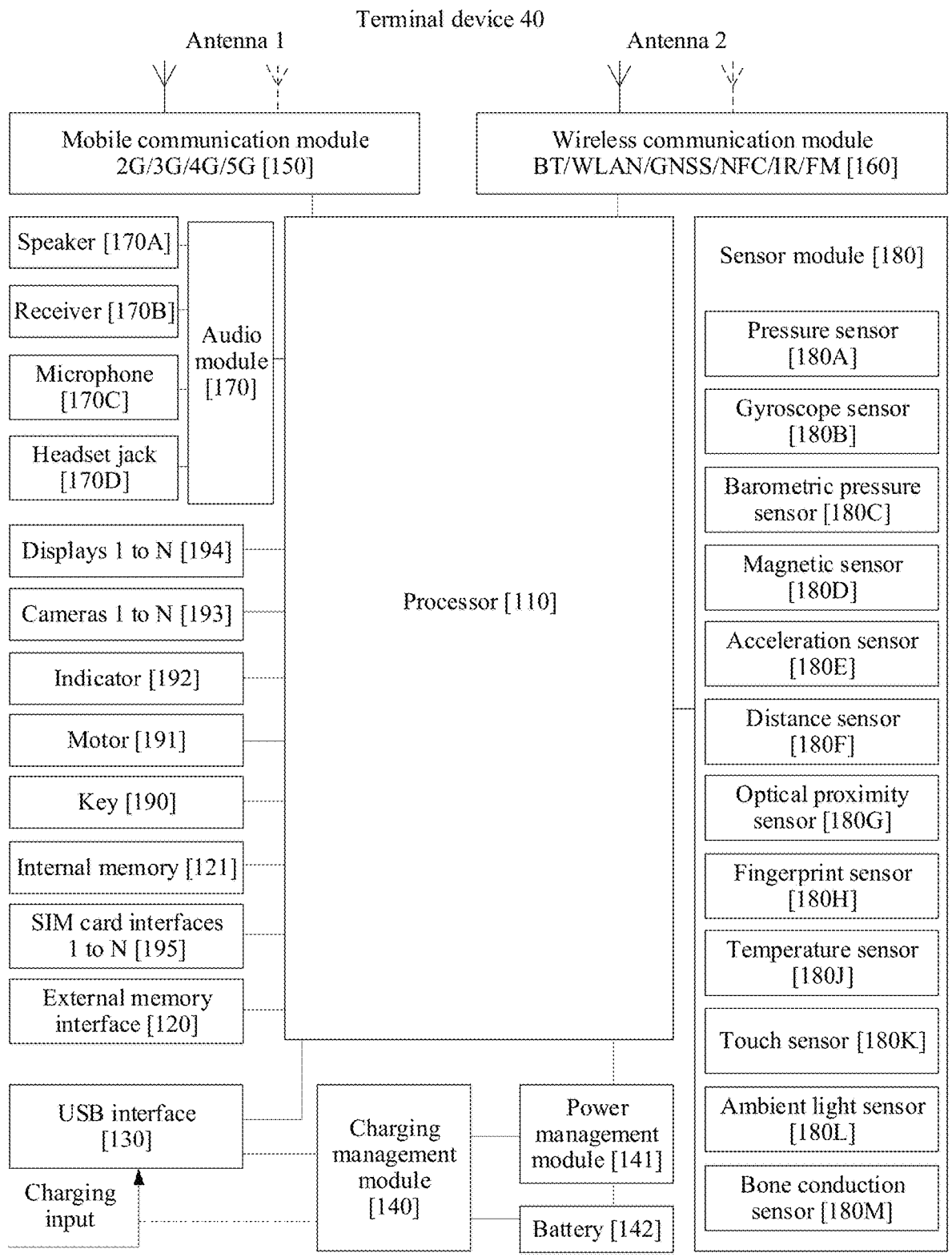

With reference to the schematic structural diagram of the terminal device 40 shown in FIG. 3, for example, FIG. 4 is a structural form of the terminal device 40 according to an embodiment of this application.

In some embodiments, a function of the processor 401 in FIG. 3 may be implemented by a processor 110 in FIG. 4.

In some embodiments, a function of the transceiver 403 in FIG. 3 may be implemented by an antenna 1, an antenna 2, a mobile communication module 150, a wireless communication module 160, and the like in FIG. 4.

The antenna 1 and the antenna 2 are configured to transmit and receive electromagnetic wave signals. Each antenna in the terminal device 40 may be configured to cover one or more communication frequency bands. Different antennas may be further multiplexed, to increase antenna utilization. For example, the antenna 1 may be multiplexed as a diversity antenna in a wireless local area network. In some other embodiments, the antenna may be used in combination with a tuning switch.

The mobile communication module 150 may provide a solution that is applied to the terminal device 40 and that is for wireless communication including 2G, 3G, 4G, 5G, and the like. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit a processed electromagnetic wave to a modem processor for demodulation. The mobile communication module 150 may further amplify a signal modulated by the modem processor, and convert an amplified signal into an electromagnetic wave through the antenna 1 for radiation. In some embodiments, at least some function modules of the mobile communication module 150 may be disposed in the processor 110. In some embodiments, at least some function modules of the mobile communication module 150 and at least some modules of the processor 110 may be disposed in a same component.

The wireless communication module 160 may provide a solution that is applied to the terminal device 40 and that is for wireless communication such as a wireless local area network (WLAN) (for example, a Wi-Fi network), Bluetooth (BT), a global navigation satellite system (GNSS), frequency modulation (FM), near field communication (NFC), or an infrared (IR) technology. The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave through the antenna 2 for radiation. When the terminal device 40 is a first device, that the wireless communication module 160 may provide a solution that is applied to the terminal device 40 and that is for NFC wireless communication means that the first device includes an NFC chip. The NFC chip can improve an NFC wireless communication function. When the terminal device 40 is a second device, that the wireless communication module 160 may provide a solution that is applied to the terminal device 40 and that is for NFC wireless communication means that the first device includes an electronic label (for example, a radio frequency identification (radio frequency identification, RFID) label). An NFC chip, near the electronic label, of another device may perform NFC wireless communication with the second device.

In some embodiments, the antenna 1 of the terminal device 40 is coupled to the mobile communication module 150, and the antenna 2 is coupled to the wireless communication module 160, so that the terminal device 40 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and the like. The GNSS may include a global positioning system (GPS), a global navigation satellite system (GLONASS), a BeiDou navigation satellite system (BDS), a quasi-zenith satellite system (QZSS), and a satellite based augmentation system (SBAS).

In some embodiments, a function of the memory 402 in FIG. 3 may be implemented by an internal memory 121, an external memory (for example, a Micro SD card) connected to an external memory interface 120, or the like in FIG. 4.

In some embodiments, a function of the output device 404 in FIG. 3 may be implemented by a display 194 in FIG. 4. The display 194 is configured to display an image, a video, and the like. The display 194 includes a display panel.

In some embodiments, a function of the input device 405 in FIG. 3 may be implemented by a mouse, a keyboard, a touchscreen device, or a sensor module 180 in FIG. 4. For example, as shown in FIG. 4, the sensor module 180 may include, for example, one or more of a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, and a bone conduction sensor 180M. This is not limited in an embodiment of the application.

In some embodiments, as shown in FIG. 4, the terminal device 40 may further include one or more of an audio module 170, a camera 193, an indicator 192, a motor 191, a key 190, a SIM card interface 195, a USB interface 130, a charging management module 140, a power management module 141, and a battery 142. The audio module 170 may be connected to a speaker 170A (which is also referred to as a "horn"), a receiver 170B (which is also referred to as an "earpiece"), a microphone 170C (which is also referred to as a "microphone" or a "microphone"), a headset jack 170D, or the like. This is not limited in an embodiment of the application.

It may be understood that the structure shown in FIG. 4 does not constitute a limitation on the terminal device 40. For example, in some other embodiments of this application, the terminal device 40 may include more or fewer components than those shown in the figure, or some components may be combined, or some components may be split, or different component arrangements may be used. The components shown in the figure may be implemented by hardware, software, or a combination of software and hardware.

With reference to FIG. 2 to FIG. 4, the following describes in detail the communication method provided in the embodiments of this application by using an example, shown in FIG. 2, in which the network device 30 interacts with any terminal device 40.

It should be noted that discontinuous transmission in a single HARQ scenario is used as an example for description in the following embodiments of this application. A general description is provided herein, and details are not described below.

It should be noted that, in the following embodiments of this application, a name of a message between network elements or a name or the like of each parameter in the message is merely an example, and may also be another name during an embodiment. This is not limited in an embodiment of the application.

Figure 5:
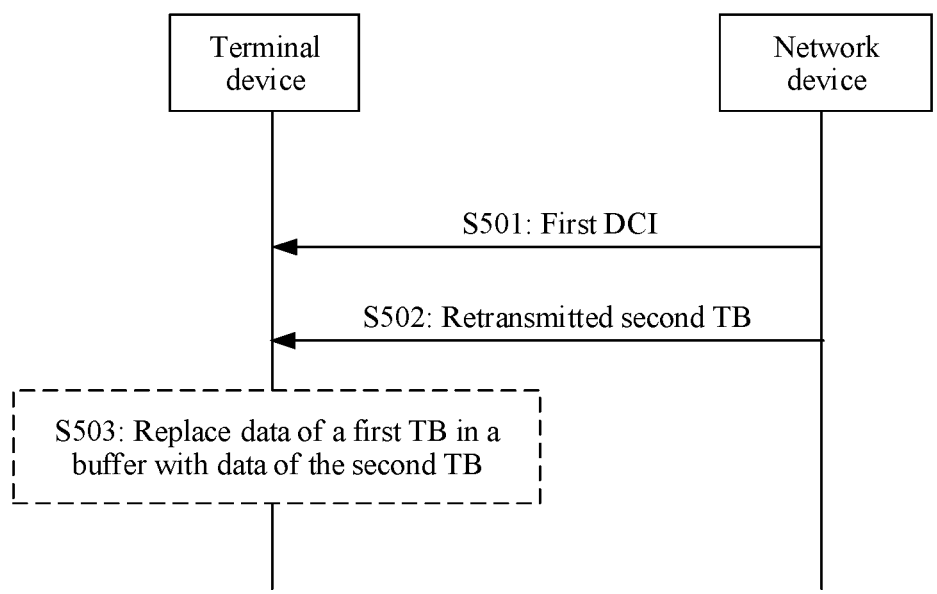
FIG. 5 is a first schematic flowchart of a communication method according to an embodiment of this application.

Downlink scheduling is used as an example. FIG. 5 shows a communication method according to an embodiment of this application, and the communication method includes the following operations S501 and S502.

S501: A network device sends first DCI to a terminal device. The terminal device receives the first DCI from the network device. The first DCI includes a first field and a second field. The first field is used to indicate that a retransmitted TB exists in a TB scheduled by using the first DCI. The second field is used to indicate an index of a retransmitted first TB in the TB scheduled by using the first DCI.

For example, the first field in an embodiment of the application may be, for example, a 1-bit NDI field, and the NDI field is used to indicate whether currently scheduled transmission is initial transmission or retransmission. For example, if an NDI bit is not toggled, it indicates retransmission; if an NDI bit is toggled, it indicates initial transmission. Alternatively, if an NDI bit is toggled, it indicates retransmission; if an NDI bit is not toggled, it indicates initial transmission. This is not limited herein.

For example, for downlink transmission, it is assumed that that an NDI bit is not toggled indicates retransmission, that an NDI bit is toggled indicates initial transmission, two TBs scheduled by using DCI are numbered based on a transmission time sequence and are separately a TB 1 and a TB 2, and transmission of the TB 1 is earlier than transmission of the TB 2 in time. In this case, if the terminal device detects no DCI within duration after sending an ACK of the TB 1, it may be considered that an NDI bit is toggled, that is, the terminal device subsequently receives the TB 2 from the network device.

For example, in an embodiment of the application, it is assumed that a quantity of TBs scheduled by using DCI used to schedule the initially transmitted TB is N. In this case, the second field may occupy $\lceil \log_2 N \rceil$ bits, and $\lceil \ \rceil$ represents rounding up. For example, the quantity of TBs scheduled by using the DCI used to schedule the initially transmitted TB is 2 (that is, N=2). In this case, the second field may occupy $\lceil \log_2 2 \rceil$=1 bit. It is assumed that two TBs scheduled by using the DCI used to schedule the initially transmitted TB are numbered based on a transmission time sequence, and are separately a TB 1 and a TB 2. Transmission of the TB 1 is earlier than transmission of the TB 2 in time. In this case, "0" may indicate that the TB 1 needs to be retransmitted, and "1" may indicate that the TB 2 needs to be retransmitted. Certainly, the correspondence is merely an example, and may alternatively be exchanged. For example, "0" may indicate that the TB 2 needs to be retransmitted, and "1" may indicate that the TB 1 needs to be retransmitted. This is not limited herein.

For example, the first DCI in an embodiment of the application may further include a fourth field. The fourth field is used to indicate a quantity M of TBs scheduled by using the first DCI, where M is a positive integer, and M is less than or equal to N. For example, M may be equal to 1. In this case, the first DCI is only used to schedule the retransmitted first TB. Alternatively, M may be greater than 1. In this case, the first DCI is not only used to schedule the retransmitted first TB, but also may be used to schedule M−1 initially transmitted TBs. This is not limited in an embodiment of the application.

For example, the fourth field may occupy one bit. For example, "0" indicates that the quantity of TBs scheduled by using the first DCI is 1, and "1" indicates that the quantity of TBs scheduled by using the first DCI is 2. Alternatively, "0" indicates that the quantity of TBs scheduled by using the first DCI is 2, and "1" indicates that the quantity of TBs scheduled by using the first DCI is 1. This is not limited in an embodiment of the application.

For example, the first DCI in an embodiment of the application may further include a flag for format N0/format N1 differentiation field, an NPDCCH order indicator field, a scheduling delay field, a resource assignment field, an MCS field, a repetition number field, a HARQ-ACK resource field, a DCI repetition number field, and the like. For details, refer to related fields in an existing DCI format N1 that does not support scheduling of a plurality of TBs. Details are not described herein again.

For example, in an embodiment of the application, a format of the first DCI may be a redesigned DCI format, or may be a format obtained after some adaptive modifications are made based on a DCI format earlier than the Rel-16. This is not limited herein. Table 3 shows a format of the first DCI that is obtained after some adaptive modifications are made based on the DCI format earlier than the Rel-16. An example in which the first DCI may be used to schedule one TB or two TBs is used for description. A TB number field and a retransmission indication field are added for the first DCI relative to the DCI earlier than the Rel-16. The TB number field corresponds to the fourth field, the retransmission indication field corresponds to the second field, and an NDI field corresponds to the first field.

TABLE 3

| Content | Quantity of bits [bits] |
|---|---|
| Flag for format N0/format N1 differentiation | 1 |
| NPDCCH order indicator | 1 |
| Scheduling delay | 3 |
| Resource assignment | 3 |
| MCS | 4 |
| Repetition number | 4 |
| NDI | 1 |
| HARQ-ACK resource | 4 |
| DCI repetition number | 2 |
| TB number | 1 |
| Retransmission indication field | 1 |

It can be learned that, compared with the existing DCI format N1 that does not support scheduling of a plurality of TBs, the quantity of bits of the first DCI is only increased by two bits. Therefore, it can be ensured that performance of the newly designed DCI is equivalent to that of the existing DCI format N1 that does not support scheduling of a plurality of TBs, and a gain of reducing DCI resource overheads can be maximized.

S502: The network device sends the retransmitted first TB to the terminal device. The terminal device receives the retransmitted first TB from the network device based on the first field and the second field.

For example, the communication method provided in an embodiment of the application may further include the following operation S503.

S503: In an embodiment, if a buffer of the terminal device stores data of a second TB, the terminal device replaces the data of the second TB in the buffer with data of the first TB.

For example, the buffer of the terminal device stores the data of the second TB in the following scenario:

The network device sends second DCI to the terminal device, and the terminal device receives the second DCI from the network device. The second DCI is used to schedule the initially transmitted first TB and the initially transmitted second TB. The network device sends the initially transmitted second TB to the terminal device. After receiving the initially transmitted second TB from the network device based on the second DCI, if the initially transmitted second TB fails to be received, the terminal device sends a NACK of the initially transmitted second TB to the network device. In this case, the buffer of the terminal device stores the data of the second TB.

Certainly, if the buffer of the terminal device stores the data of the first TB, the foregoing operation S503 may not be performed herein. The buffer of the terminal device stores the data of the first TB in the following scenario:

The network device sends third DCI to the terminal device, and the terminal device receives the third DCI from the network device. The third DCI is used to schedule the initially transmitted first TB and the initially transmitted second TB. The network device sends the initially transmitted first TB to the terminal device. After receiving the initially transmitted first TB from the network device based on the third DCI, if the initially transmitted first TB fails to be received, the terminal device sends a NACK of the initially transmitted first TB to the network device. In this case, the buffer of the terminal device stores the data of the first TB.

The following further describes the foregoing operations S501 to S503 with reference to an example.

Figure 6:
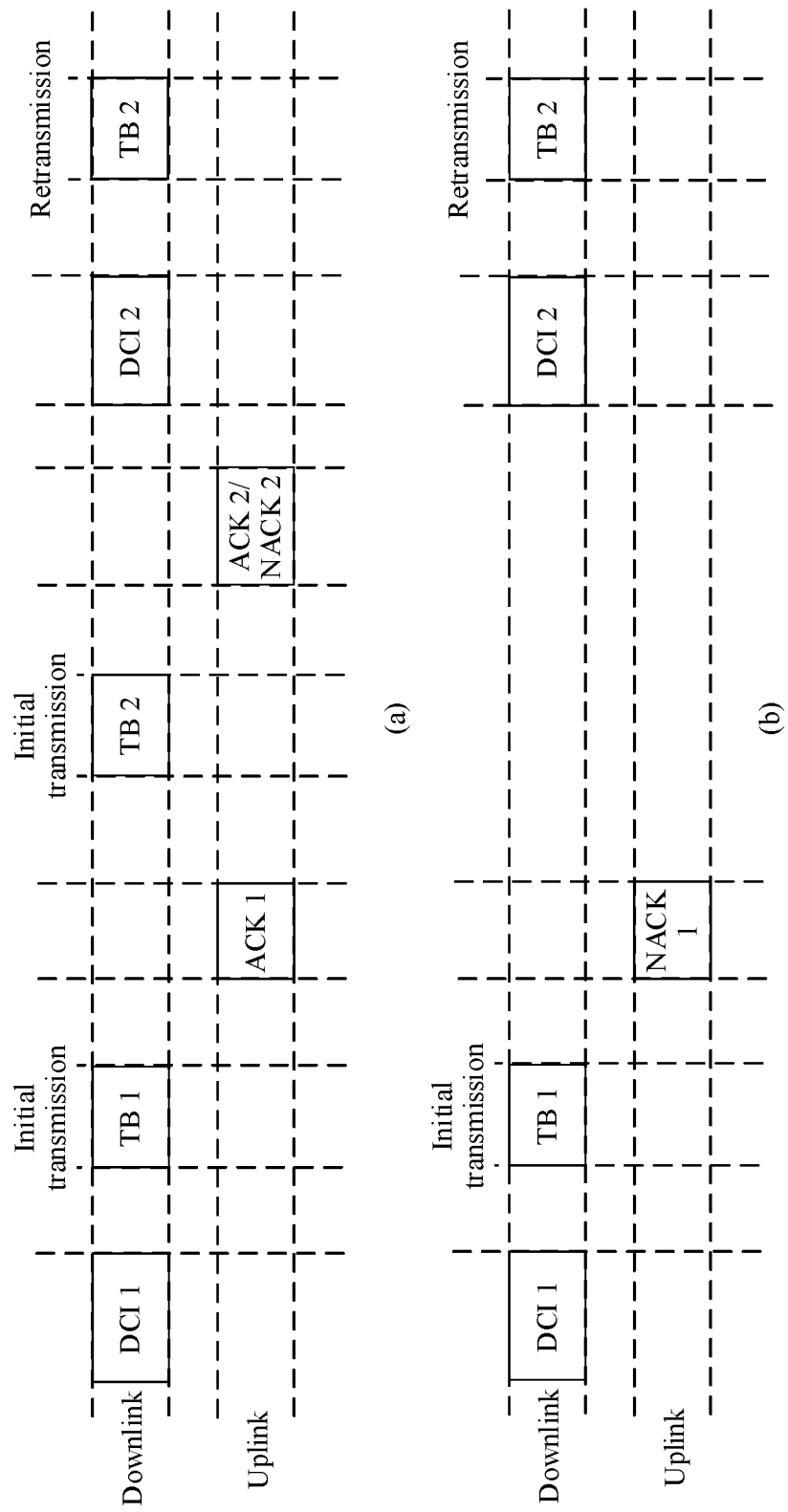
FIG. 6 is a first schematic diagram of discontinuous transmission scheduling according to an embodiment of this application.

For example, that an NDI bit is not toggled indicates retransmission, and that an NDI bit is toggled indicates initial transmission. It is assumed that N=2 and M=1. In this case, the network device may send DCI 1 to the terminal device, where a TB number field in the DCI 1 indicates that a quantity of TBs scheduled by using the DCI 1 is 2. It is assumed that the DCI 1 is used to schedule a TB 1 and a TB 2, and transmission of the TB 1 is earlier than transmission of the TB 2 in time. In this case, the network device may send the TB 1 to the terminal device, and the terminal device receives the TB 1 from the network device. If the terminal device fails to receive the TB 1, the terminal device sends a NACK 1 to the network device. However, the network device incorrectly detects the NACK 1 as an ACK 1. In this case, from a perspective of the network device, as shown in (a) in FIG. 6, the network device considers that the TB 1 is correctly received by the terminal device, and continues to send the TB 2 after duration. Because the TB 2 cannot be correctly received by the terminal device, the network device sends DCI 2 to the terminal device, where a TB number field in the DCI 2 indicates that a quantity of TBs scheduled by using the DCI 2 is 1, that is, M=1, an NDI bit corresponding to an NDI field in the DCI 2 is not toggled relative to that corresponding to an NDI field in the DCI 1, and a retransmission indication field in the DCI 2 indicates that retransmission of the TB 2 is currently scheduled. From a perspective of the terminal device, as shown in (b) in FIG. 6, the TB 1 fails to be received, and the terminal device expects retransmission of the TB 1. However, the terminal device subsequently receives the DCI 2, and the retransmission indication field in the DCI 2 indicates that the retransmission of the TB 2 is currently scheduled. Therefore, the terminal device may learn that the retransmission of the TB 2 is currently scheduled by using the DCI 2, so that a problem, in a current technology, that the network device and the terminal device have inconsistent understandings of retransmission scheduled by using the DCI 2 does not occur. In addition, based on an existing mechanism, the terminal device fails to receive the TB 1, and the buffer of the terminal device stores data of the TB 1. In this abnormal scenario, if the terminal device combines retransmission data of the TB 2 with the data that is of the TB 1 and that is stored in the buffer of the terminal device, the TB 2 fails to be received. In an embodiment of the application, if the buffer of the terminal device stores the data of the TB 1, the terminal device replaces the data of the TB 1 in the buffer with the data of the TB 2, so that a receiving failure of the TB 2 can be further avoided.

Figure 7:
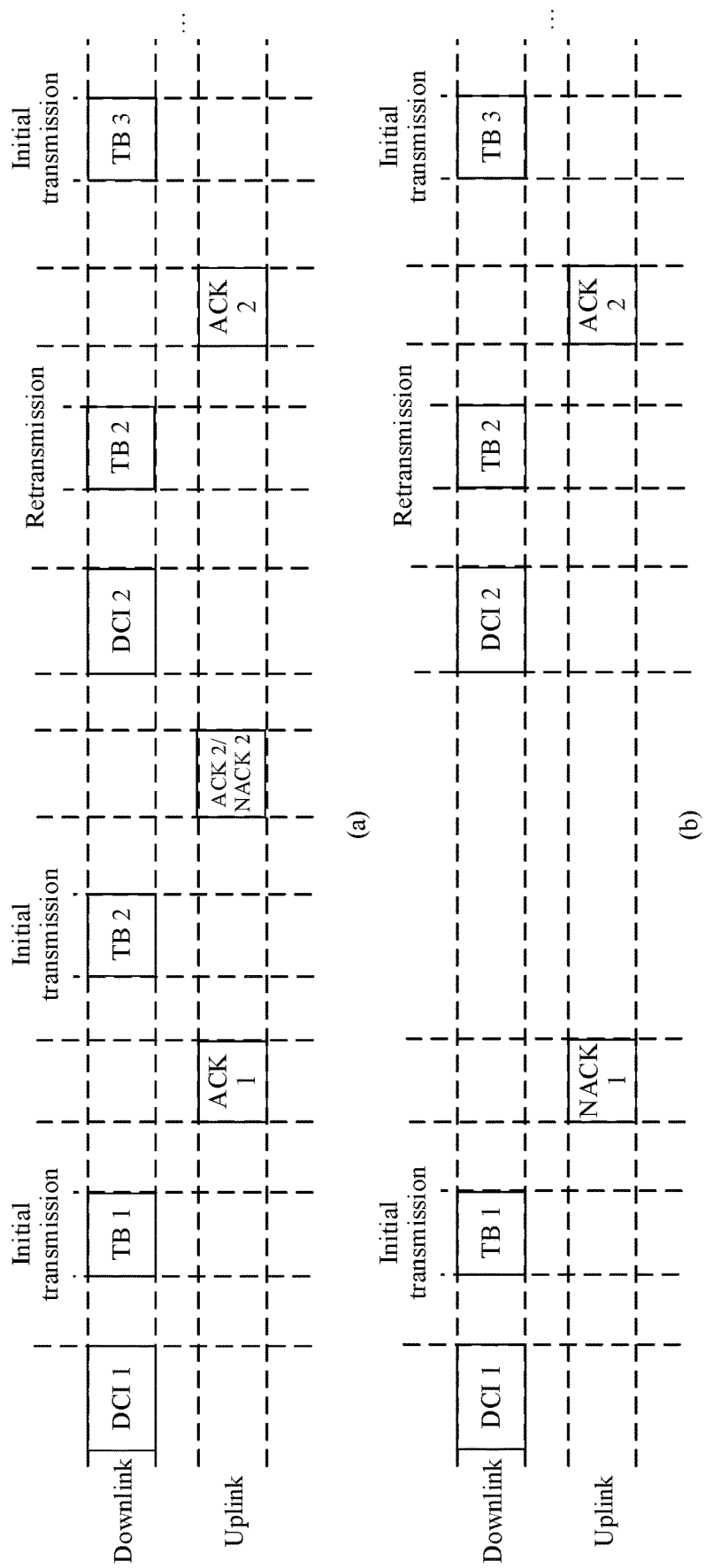
FIG. 7 is a second schematic diagram of discontinuous transmission scheduling according to an embodiment of this application.

The foregoing uses an example in which the DCI 2 is only used to schedule the retransmitted TB 2 for description. Certainly, the DCI 2 may not only be used to schedule the retransmitted TB 2, but also may be further used to schedule an initially transmitted TB. It is assumed that the initially transmitted TB is a TB 3. In this case, as shown in (a) and (b) in FIG. 7, after receiving an ACK corresponding to the retransmitted TB 2, the network device may send the initially transmitted TB 3 to the terminal device. A quantity of TBs scheduled by using the DCI 2 is not limited in an embodiment of the application.

Based on the communication method provided in an embodiment of the application, in an aspect, because the first DCI sent by the network device to the terminal device includes the index used to indicate the retransmitted first TB in the TB scheduled by using the first DCI, after receiving the first DCI, the terminal device may learn that the retransmitted TB scheduled by using the first DCI is the first TB, and further receive the retransmitted first TB from the network device based on the first DCI, so that a problem, in an existing discontinuous transmission scenario, that the network device and the terminal device have inconsistent understandings of retransmission scheduled by using the DCI can be resolved. In another aspect, if the buffer of the terminal device stores the data of the second TB, the terminal device replaces the data of the second TB in the buffer with the data of the first TB. Therefore, an existing receiving failure of the first TB that is caused by a data combination failure in the buffer of the terminal device can be avoided.

The processor 301 in the network device 30 shown in FIG. 3 may invoke application program code stored in the memory 302, to instruct the network device to perform the actions of the network device in operations S501 to S503. The processor 401 in the terminal device 40 shown in FIG. 3 may invoke application program code stored in the memory 402, to instruct the network device to perform the actions of the terminal device in operations S501 to S503. This is not limited in an embodiment.

Figure 8:
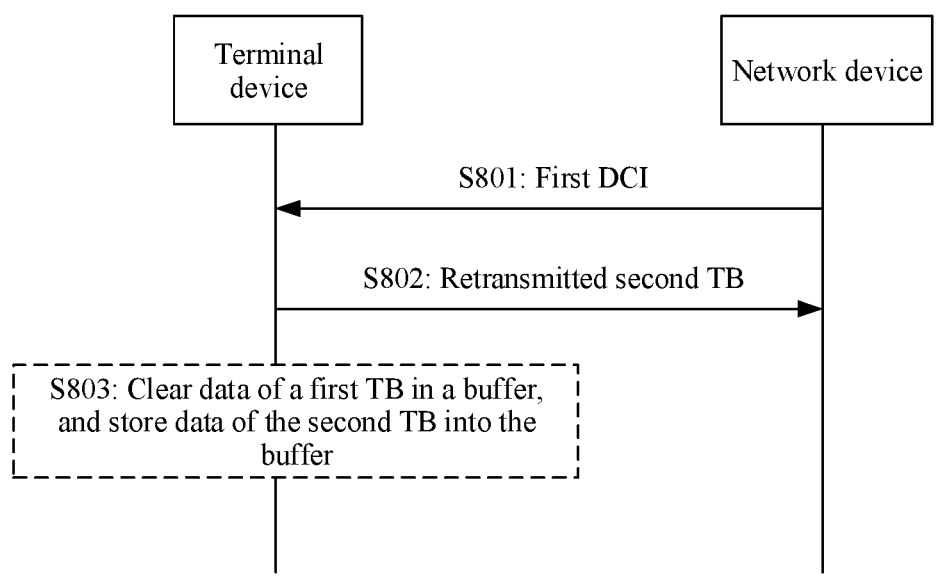
FIG. 8 is a second schematic flowchart of a communication method according to an embodiment of this application.

Alternatively, uplink scheduling is used as an example. FIG. 8 shows a communication method according to an embodiment of this application, and the communication method includes the following operations S801 and S802.

S801: A network device sends first DCI to a terminal device. The terminal device receives the first DCI from the network device. The first DCI includes a first field and a second field. The first field is used to indicate that a retransmitted TB exists in a TB scheduled by using the first DCI. The second field is used to indicate an index of a retransmitted first TB in the TB scheduled by using the first DCI.

For related descriptions of the first field and the second field, refer to operation S501 in the embodiment shown in FIG. 5. Details are not described herein again.

For example, for uplink transmission, it is assumed that that an NDI bit is not toggled indicates retransmission, that an NDI bit is toggled indicates initial transmission, two TBs scheduled by using DCI are numbered based on a transmission time sequence and are separately a TB 1 and a TB 2, and transmission of the TB 1 is earlier than transmission of the TB 2 in time. In this case, if the terminal device detects no DCI within duration after sending the TB 1, the terminal device may consider that an NDI bit is toggled, subsequently send the TB 2 to the terminal device, and clear data that is of the TB 1 and that is stored in a buffer.

For example, the first DCI in an embodiment of the application may further include a fourth field. For related descriptions of the fourth field, refer to operation S501 in the embodiment shown in FIG. 5. Details are not described herein again.

For example, the first DCI in an embodiment of the application may further include a third field, and the third field is used to indicate a second redundancy version corresponding to the retransmitted first TB. However, a redundancy version corresponding to the initially transmitted first TB is a specified first redundancy version. In other words, the redundancy version corresponding to the initially transmitted TB is preset, and the redundancy version corresponding to the retransmitted TB is indicated by the DCI.

Alternatively, for example, the first DCI provided in an embodiment of the application does not include a field used to indicate a redundancy version. However, a redundancy version corresponding to the initially transmitted first TB is a specified first redundancy version, and a redundancy version corresponding to the retransmitted first TB is a specified second redundancy version. In other words, the redundancy version corresponding to the retransmitted TB and the redundancy version corresponding to the initially transmitted TB are both preset. In this way, for a DCI design, one bit may be further saved.

In an embodiment of the application, the first redundancy version may be different from the second redundancy version, or the first redundancy version may be the same as the second redundancy version. This is not limited in an embodiment of the application. For example, the first redundancy version may be an RV 2, and the second redundancy version may be an RV 0. Alternatively, the first redundancy version may be an RV 0, and the second redundancy version may be an RV 2.

For example, the first DCI in an embodiment of the application may further include a flag for format N0/format N1 differentiation field, a subcarrier indication field, a scheduling delay field, a resource assignment field, an MCS field, a repetition number field, a DCI repetition number field, and the like. For details, refer to related fields in an existing DCI format N0 that does not support scheduling of a plurality of TBs. Details are not described herein again.

For example, in an embodiment of the application, a format of the first DCI may be a redesigned DCI format, or may be a format obtained after some adaptive modifications are made based on a DCI format earlier than the Rel-16. This is not limited herein. Table 4 and Table 5 show formats of the first DCI that are obtained after some adaptive modifications are made based on the DCI format earlier than the Rel-16. An example in which the first DCI may be used to schedule one TB or two TBs is used for description. In Table 4, a TB number field and a retransmission indication field are added for the first DCI relative to the DCI earlier than the Rel-16. The TB number field corresponds to the fourth field, the retransmission indication field corresponds to the second field, an NDI field corresponds to the first field, and an RV field indicates the second redundancy version corresponding to the retransmitted first TB. The redundancy version corresponding to the initially transmitted first TB is the specified first redundancy version. In Table 5, a TB number field and a retransmission indication field are added for the first DCI relative to the DCI earlier than the Rel-16, and an RV field is reduced relative to the DCI earlier than the Rel-16. The TB number field corresponds to the fourth field, the retransmission indication field corresponds to the second field, an NDI field corresponds to the first field, the redundancy version corresponding to the initially transmitted first TB is the specified first redundancy version, and the redundancy version corresponding to the retransmitted first TB is the specified second redundancy version.

TABLE 4

| Content | Quantity of bits [bits] |
|---|---|
| Flag for format N0/format N1 differentiation | 1 |
| Subcarrier indication | 6 |
| Resource assignment | 3 |
| Scheduling delay | 2 |
| MCS | 4 |
| RV | 1 |
| Repetition number | 3 |
| NDI | 1 |
| DCI repetition number | 2 |
| TB number | 1 |
| Retransmission indication field | 1 |

TABLE 5

| Content | Quantity of bits [bits] |
|---|---|
| Flag for format N0/format N1 differentiation | 1 |
| Subcarrier indication | 6 |
| Resource assignment | 3 |
| Scheduling delay | 2 |
| MCS | 4 |
| Repetition number | 3 |
| NDI | 1 |
| DCI repetition number | 2 |
| TB number | 1 |
| Retransmission indication field | 1 |

It can be learned that, compared with the existing DCI format N0 that does not support scheduling of a plurality of TBs, the quantity of bits of the first DCI in Table 4 is only increased by two bits, and the quantity of bits of the first DCI in Table 5 is only increased by one bit. Therefore, it can be ensured that performance of the newly designed DCI is equivalent to that of the existing DCI format N0 that does not support scheduling of a plurality of TBs, and a gain of reducing DCI resource overheads can be maximized.

S802: The terminal device sends the retransmitted first TB to the network device based on the first field and the second field. The network device receives the retransmitted first TB from the terminal device.

For example, the communication method provided in an embodiment of the application may further include the following operation S803.

S803: In an embodiment, if the buffer of the terminal device stores data of a second TB, the terminal device clears the data of the second TB in the buffer, and stores data of the first TB into the buffer.

For example, the buffer of the terminal device stores the data of the second TB in the following scenario:

The network device sends second DCI to the terminal device, and the terminal device receives the second DCI from the network device. The second DCI is used to schedule the initially transmitted first TB and the initially transmitted second TB. The terminal device sends the initially transmitted first TB to the network device based on the second DCI, and the network device receives the initially transmitted first TB from the terminal device. If the terminal device receives no DCI within first specified duration, the terminal device sends the initially transmitted second TB to the network device based on the second DCI, and the network device receives the initially transmitted second TB from the terminal device. In this case, the buffer of the terminal device stores the data of the second TB.

Certainly, if the buffer of the terminal device stores the data of the first TB, the foregoing operation S803 may not be performed herein. The buffer of the terminal device stores the data of the first TB in the following scenario:

The network device sends third DCI to the terminal device, and the terminal device receives the third DCI from the network device. The third DCI is used to schedule the initially transmitted first TB and the initially transmitted second TB. The terminal device sends the initially transmitted first TB to the network device based on the third DCI, and if the terminal device receives the first DCI within first specified duration, the buffer of the terminal device stores the data of the first TB.

The following further describes the foregoing operations S801 to S803 with reference to an example.

Figure 9:
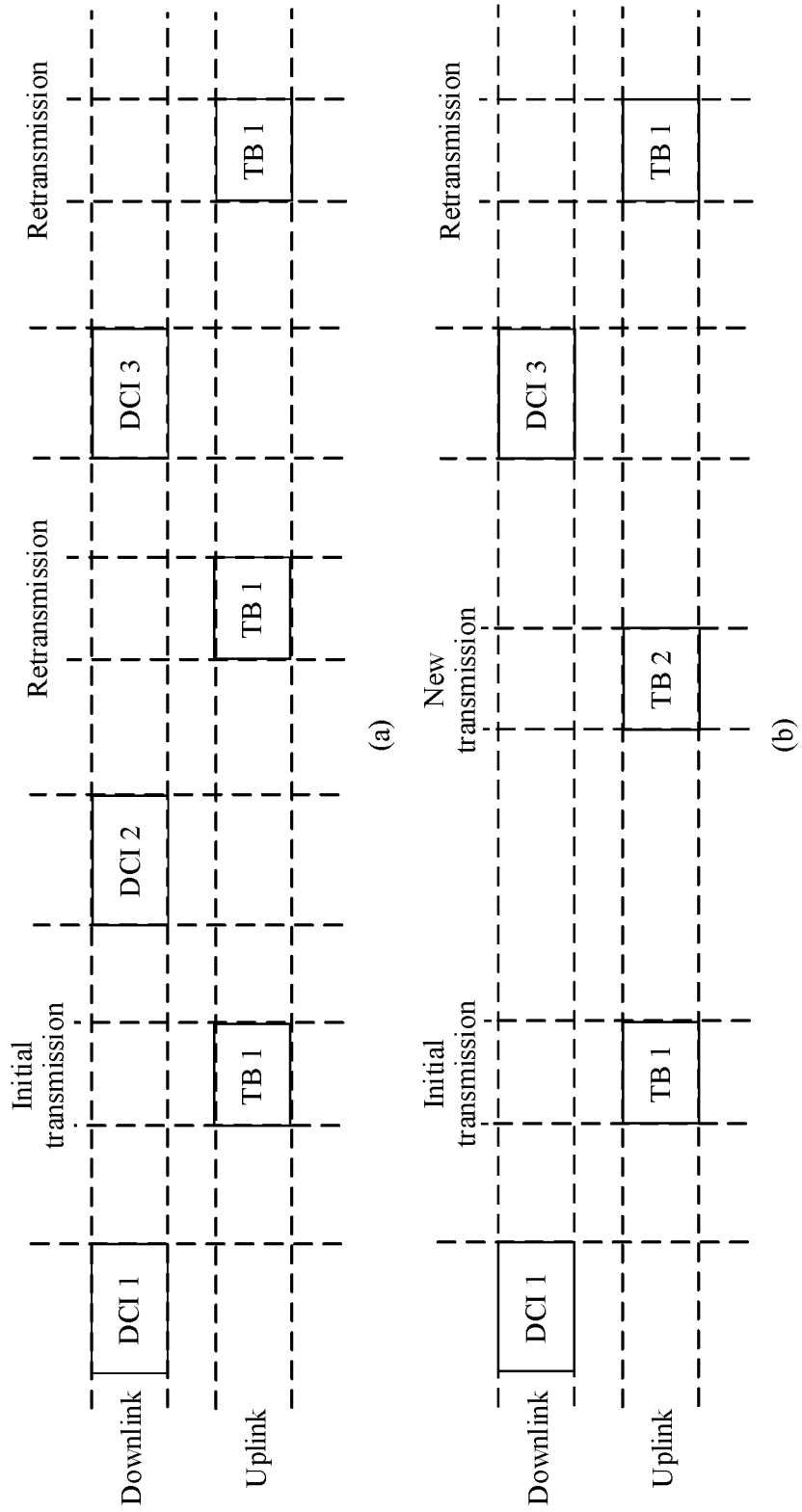
FIG. 9 is a third schematic diagram of discontinuous transmission scheduling according to an embodiment of this application.

For example, that an NDI bit is not toggled indicates retransmission, and that an NDI bit is toggled indicates initial transmission. It is assumed that N=2 and M=1. In this case, the network device may send DCI 1 to the terminal device, where a TB number field in the DCI 1 indicates that a quantity of TBs scheduled by using the DCI 1 is 2. It is assumed that the DCI 1 is used to schedule a TB 1 and a TB 2, and transmission of the TB 1 is earlier than transmission of the TB 2 in time. In this case, the terminal device may send the TB 1 to the network device. It is assumed that the network device fails to receive the TB 1. In this case, the network device sends DCI 2 to the terminal device to schedule retransmission of the TB 1, but the terminal device does not correctly receive the DCI 2. In this case, from a perspective of the network device, as shown in (a) in FIG. 9, the network device does not correctly receive the TB 1, and subsequently sends DCI 3 to the terminal device, where a TB number field in the DCI 3 indicates that a quantity of TBs scheduled by using the DCI 3 is 1, that is, M=1, an NDI bit corresponding to an NDI field in the DCI 3 is not toggled relative to that corresponding to an NDI field in the DCI 2, and a retransmission indication field in the DCI 3 indicates that retransmission of the TB 1 is currently scheduled. From a perspective of the terminal device, as shown in (b) in FIG. 9, the terminal device does not detect the DCI 2 within duration after sending the TB 1, considers that the TB 1 is successfully transmitted, and continues to send the TB 2 to the network device. However, the terminal device subsequently detects the DCI 3, and the retransmission indication field in the DCI 3 indicates that the retransmission of the TB 1 is currently scheduled. Therefore, the terminal device may learn that the retransmission of the TB 1 is currently scheduled by using the DCI 3, and send the TB 1 to the network device, so that a problem, in a current technology, that the network device and the terminal device have inconsistent understandings of retransmission scheduled by using the DCI 3 does not occur. In addition, in an embodiment of the application, the network device fails to receive the TB 1, a buffer of the network device stores the TB 1, and the retransmission of the TB 1 is scheduled by using the DCI 3. Therefore, a receiving failure of the TB 1, in the current technology, that is caused by the network device by combining retransmission data of the TB 2 with data that is of the TB 1 and that is stored in the buffer of the network device can be avoided. In addition, after the terminal device sends the TB 2 to the network device, the data of the TB 2 is stored in the buffer of the terminal device. Therefore, in an embodiment of the application, before the terminal device sends the retransmitted TB 1 to the network device, the terminal device clears the data of the TB 2 in the buffer, and stores the data of the TB 1 into the buffer.

Figure 10:
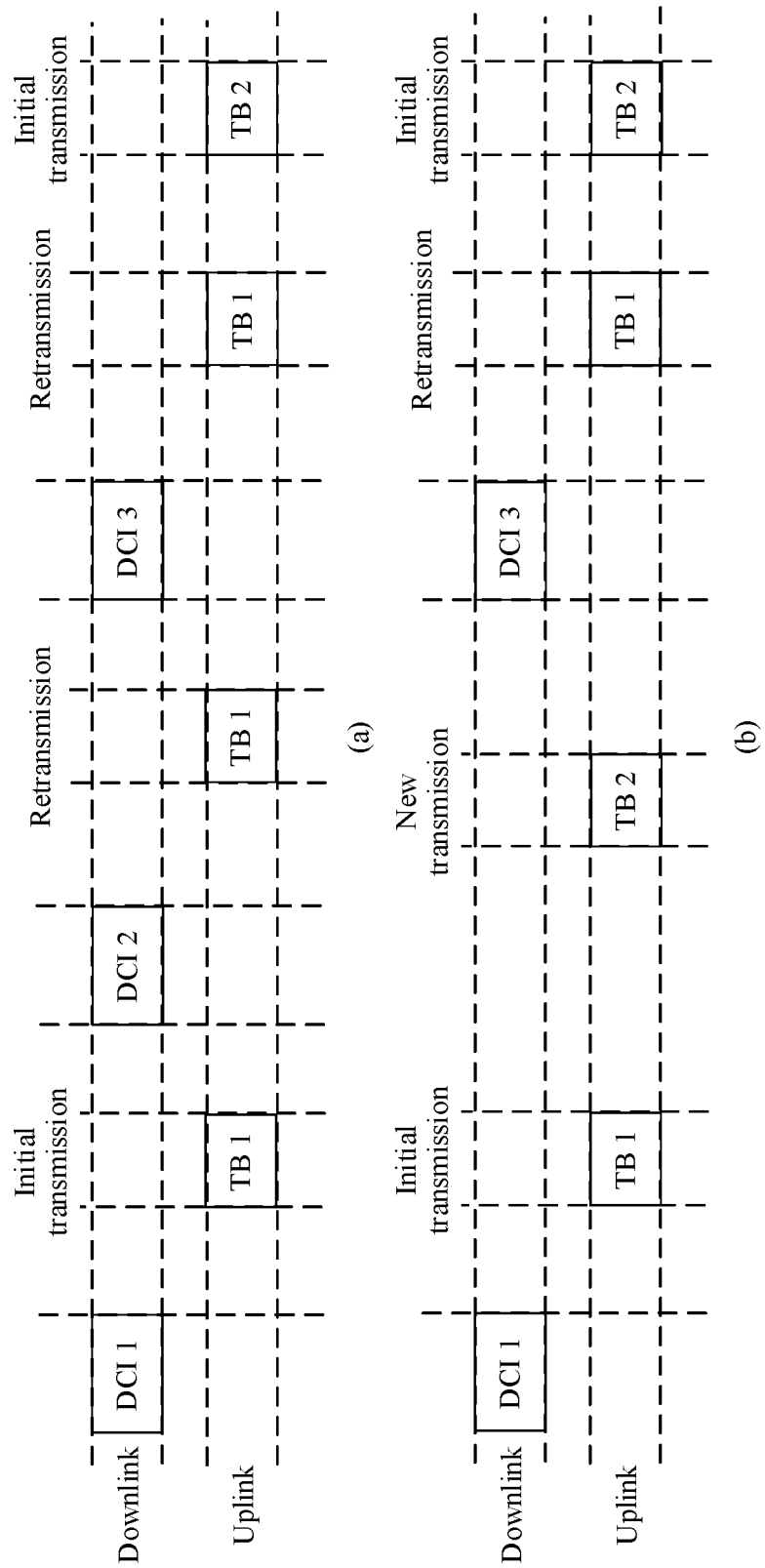
FIG. 10 is a fourth schematic diagram of discontinuous transmission scheduling according to an embodiment of this application.

The foregoing uses an example in which the DCI 3 is only used to schedule the retransmitted TB 1 for description. Certainly, the DCI 3 may not only be used to schedule the retransmitted TB 1, but also may be further used to schedule an initially transmitted TB. It is assumed that the initially transmitted TB is a TB 2. In this case, as shown in (a) and (b) in FIG. 10, after sending the retransmitted TB 1 to the network device, if the terminal device receives no DCI within duration, the terminal device may send the initially transmitted TB 2 to the network device. A quantity of TBs scheduled by using the DCI 3 is not limited in an embodiment of the application.

Based on the communication method provided in an embodiment of the application, in an aspect, because the first DCI sent by the network device to the terminal device includes the index used to indicate the retransmitted first TB in the TB scheduled by using the first DCI, after receiving the first DCI, the terminal device may learn that the retransmitted TB scheduled by using the first DCI is the first TB, and further send the retransmitted first TB to the network device, so that a problem, in an existing discontinuous transmission scenario, that the network device and the terminal device have inconsistent understandings of retransmission scheduled by using the DCI can be resolved. In another aspect, the buffer of the network device stores the data of the first TB, and the retransmitted TB sent by the terminal device to the network device is the first TB. Therefore, an existing receiving failure of the first TB that is caused by a data combination failure in the buffer of the network device can be avoided.

The processor 301 in the network device 30 shown in FIG. 3 may invoke application program code stored in the memory 302, to instruct the network device to perform the actions of the network device in operations S801 to S803. The processor 401 in the terminal device 40 shown in FIG. 3 may invoke application program code stored in the memory 402, to instruct the network device to perform the actions of the terminal device in operations S801 to S803. This is not limited in an embodiment.

Figure 11:
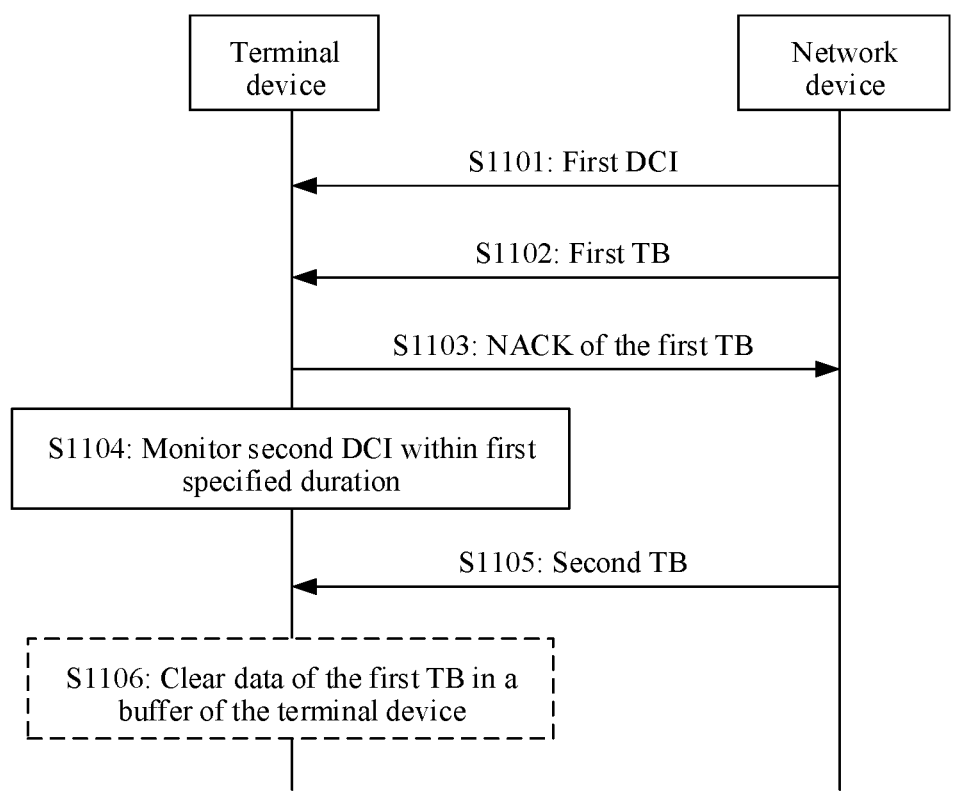
FIG. 11 is a third schematic flowchart of a communication method according to an embodiment of this application.

Alternatively, downlink scheduling is used as an example. FIG. 11 shows another communication method according to an embodiment of this application, and the communication method includes the following operations S1101 to S1105.

S1101: A network device sends first DCI to a terminal device. The terminal device receives the first DCI from the network device. The first DCI is used to schedule a first TB and a second TB.

S1102: The network device sends the first TB to the terminal device. The terminal device receives the first TB from the network device based on the first DCI.

S1103: If the terminal device fails to receive the first TB, the terminal device sends a NACK of the first TB to the network device. The network device receives the NACK of the first TB from the terminal device.

S1104: The terminal device monitors second DCI within first specified duration.

S1105: The network device sends the second TB to the terminal device; and if the terminal device does not receive the second DCI within the first specified duration, the terminal device receives the second TB from the network device.

S1106: In an embodiment, if the terminal device does not receive the second DCI within the first specified duration, the terminal device clears data of the first TB in a buffer of the terminal device.

If operation S1106 is performed, there is no necessary execution sequence between operation S1105 and operation S1106 in an embodiment of the application. Operation S1105 may be first performed, and then operation S1106 may be performed. Alternatively, operation S1106 may be first performed, and then operation S1105 may be performed. Alternatively, operation S1105 and operation S1106 may be performed simultaneously. This is not limited in an embodiment of the application.

In the foregoing operations S1101 to S1106:

For example, the first TB in an embodiment of the application may be an initially transmitted first TB or a retransmitted first TB. This is not limited herein.

Alternatively, for example, the second TB in an embodiment of the application may be an initially transmitted second TB or a retransmitted second TB. This is not limited herein.

For example, the DCI (including the first DCI or the second DCI) in an embodiment of the application may include a field used to indicate a quantity of TBs scheduled by using the DCI, for example, a field 1. The field 1 occupies one bit. For example, "0" indicates that the quantity of TBs scheduled by using the DCI is 1, and "1" indicates that the quantity of TBs scheduled by using the DCI is 2. Alternatively, "0" indicates that the quantity of TBs scheduled by using the DCI is 2, and "1" indicates that the quantity of TBs scheduled by using the DCI is 1. This is not limited in an embodiment of the application.

For example, the DCI (including the first DCI or the second DCI) in an embodiment of the application may further include a flag for format N0/format N1 differentiation field, an NPDCCH order indicator field, a scheduling delay field, a resource assignment field, an MCS field, a repetition number field, a HARQ-ACK resource field, a DCI repetition number field, and the like. For details, refer to related fields in an existing DCI format N1 that does not support scheduling of a plurality of TBs. Details are not described herein again. In addition, the DCI (including the first DCI or the second DCI) in an embodiment of the application may further include an NDI field, where the NDI field is used to indicate whether a retransmitted TB exists in a TB scheduled by using the DCI.

For example, a format of the DCI (including the first DCI or the second DCI) in an embodiment of the application may be a redesigned DCI format, or may be a format obtained after some adaptive modifications are made based on a DCI format earlier than the Rel-16. This is not limited herein. Table 6 shows a format of the DCI that is obtained after some adaptive modifications are made based on the DCI format earlier than the Rel-16. An example in which the DCI may be used to schedule one TB or two TBs is used for description. A TB number field is added for the DCI relative to the DCI earlier than the Rel-16. An NDI field is used to indicate whether a retransmitted TB exists in a TB scheduled by using the DCI.

TABLE 6

| Content | Quantity of bits [bits] |
|---|---|
| Flag for format N0/format N1 differentiation | 1 |
| NPDCCH order indicator | 1 |
| Scheduling delay | 3 |
| Resource assignment | 3 |
| MCS | 4 |
| Repetition number | 4 |
| NDI | 1 |
| HARQ-ACK resource | 4 |
| DCI repetition number | 2 |
| TB number | 1 |

It can be learned that, compared with the existing DCI format N1 that does not support scheduling of a plurality of TBs, the quantity of bits of the DCI is only increased by one bit. Therefore, it can be ensured that performance of the newly designed DCI is equivalent to that of the existing DCI format N1 that does not support scheduling of a plurality of TBs, and a gain of reducing DCI resource overheads can be maximized.

The following further describes the foregoing operations S1101 to S1106 with reference to an example.

Figure 12:
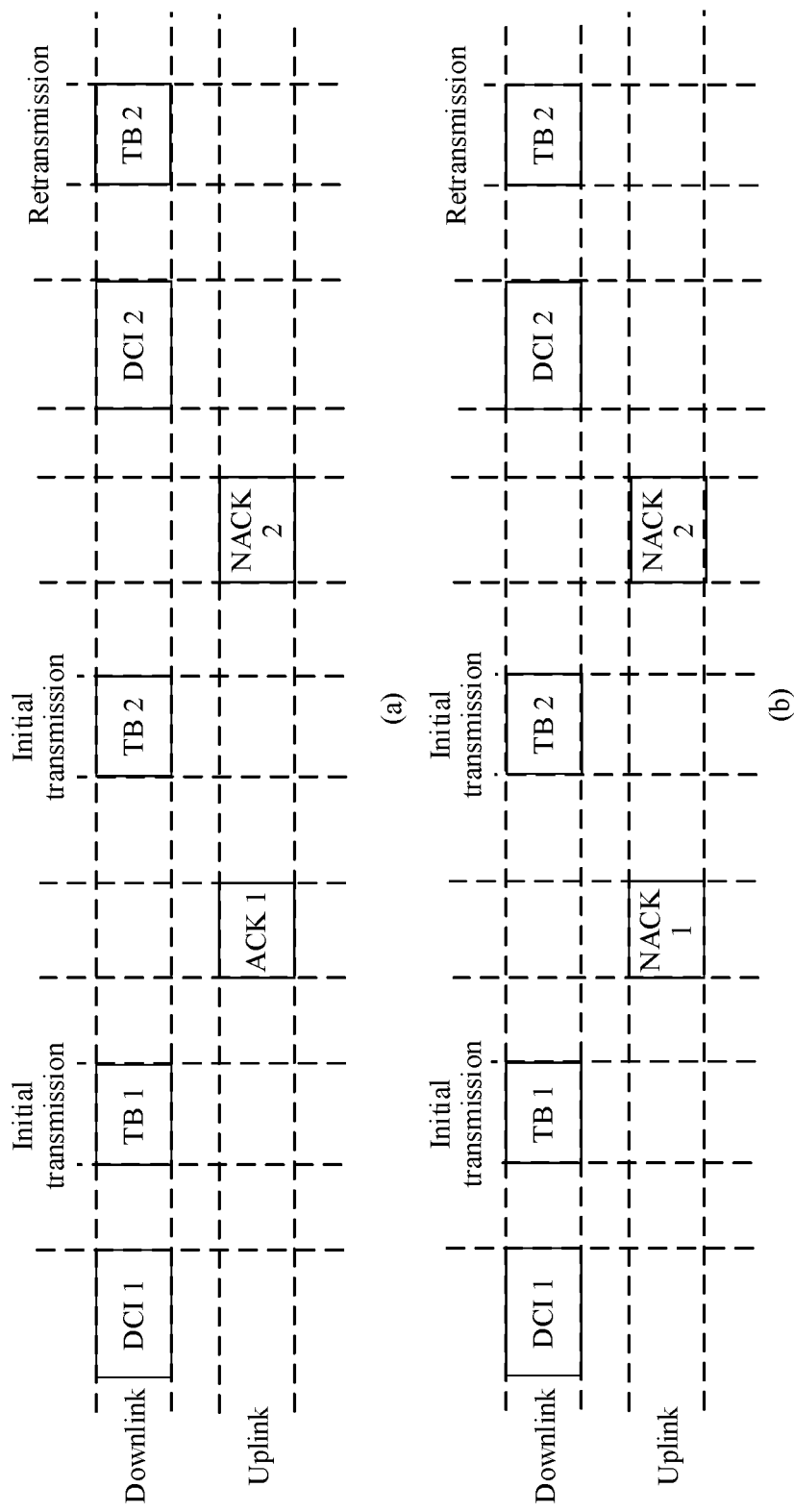
FIG. 12 is a fifth schematic diagram of discontinuous transmission scheduling according to an embodiment of this application.

For example, that an NDI bit is not toggled indicates retransmission, and that an NDI bit is toggled indicates initial transmission. It is assumed that the network device may send DCI 1 to the terminal device, where a TB number field in the DCI 1 indicates that a quantity of TBs scheduled by using the DCI 1 is 2. It is assumed that the DCI 1 is used to schedule a TB 1 and a TB 2, and transmission of the TB 1 is earlier than transmission of the TB 2 in time. In this case, the network device may send the TB 1 to the terminal device, and the terminal device receives the TB 1 from the network device. If the terminal device fails to receive the TB 1, the terminal device sends a NACK 1 to the network device. However, the network device incorrectly detects the NACK 1 as an ACK 1. In this case, from a perspective of the network device, as shown in (a) in FIG. 12, the network device considers that the TB 1 is correctly received by the terminal device, and continues to send the TB 2 after duration. If the TB 2 fails to be received, the network device receives a NACK 2 from the terminal device. Therefore, the network device sends DCI 2 to the terminal device, where the DCI 2 is used to schedule retransmission of the TB 2. From a perspective of the terminal device, as shown in (b) in FIG. 12, the TB 1 fails to be received, and the terminal device expects retransmission of the TB 1. However, the terminal device receives no DCI within the first specified duration. In this case, the terminal device receives the TB 2 from the network device. Further, if the terminal device receives no DCI within the first specified duration, the terminal device may clear data of the TB 1 in the buffer. If the TB 2 fails to be received, the terminal device sends the NACK of the TB 2 to the network device. Further, if the terminal device receives the DCI 2 from the network device within specified duration, the terminal device may learn that the retransmission of the TB 2 is currently scheduled by using the DCI 2, so that a problem that the network device and the terminal device have inconsistent understandings can be avoided, and a receiving failure of the TB 2 that is caused by the terminal device by combining retransmission data of the TB 2 with the data that is of the TB 1 and that is stored in the buffer of the terminal device can be avoided.

Figure 13:
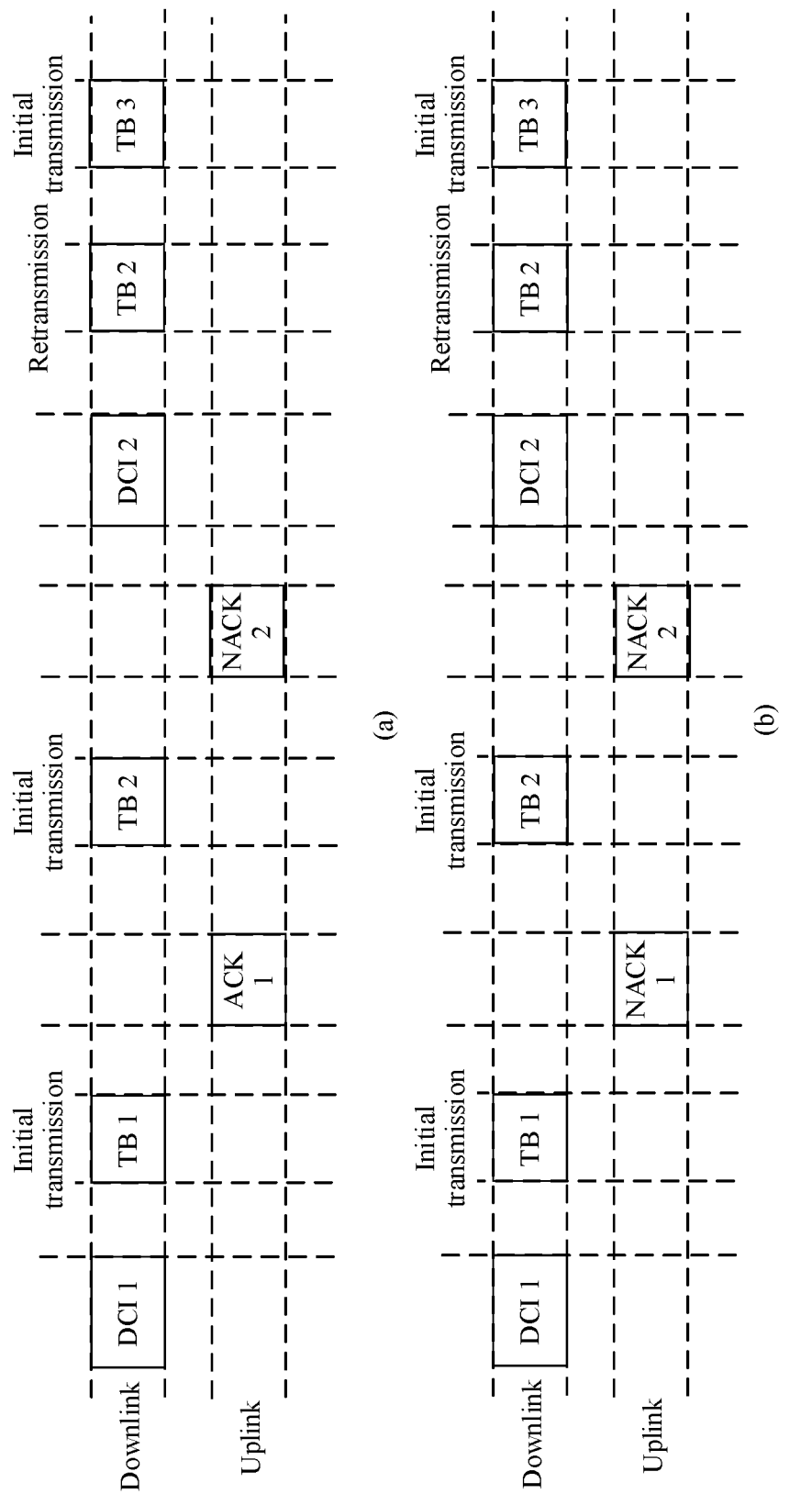
FIG. 13 is a sixth schematic diagram of discontinuous transmission scheduling according to an embodiment of this application.

In an embodiment, the DCI 2 may be further used to schedule initial transmission of a TB 3. As shown in (a) and (b) in FIG. 13, a quantity of TBs scheduled by using the DCI 2 is not limited in an embodiment of the application.

In conclusion, in other words, for downlink transmission, it is assumed that that an NDI bit is not toggled indicates retransmission, that an NDI bit is toggled indicates initial transmission, two TBs scheduled by using DCI are numbered based on a transmission time sequence and are separately a TB 1 and a TB 2, and transmission of the TB 1 is earlier than transmission of the TB 2 in time. In this case, if the terminal device detects no DCI within duration after sending a NACK of the TB 1, the terminal device may consider that an NDI bit is toggled, and subsequently receive the TB 2 from the network device.

Based on the communication method provided in an embodiment of the application, the network device sends, to the terminal device, the first DCI used to schedule the first TB and the second TB. After the network device sends the first TB to the terminal device, if the first TB fails to be received, and the terminal device does not receive the second DCI within the first specified duration, the terminal device may consider that an NDI bit is toggled. The network device continues to send the second TB to the terminal device, and the terminal device receives the second TB from the network device. Therefore, a problem, in an existing discontinuous transmission scenario, that the network device and the terminal device have inconsistent understandings of retransmission scheduled by using the DCI can be resolved. Further, if the terminal device does not receive the second DCI within the first specified duration, the terminal device clears the data of the first TB in the buffer of the terminal device. Therefore, an existing receiving failure of the second TB that is caused by a data combination failure in the buffer of the terminal device can be avoided.

The processor 301 in the network device 30 shown in FIG. 3 may invoke application program code stored in the memory 302, to instruct the network device to perform the actions of the network device in operations S1101 to S1105. The processor 401 in the terminal device 40 shown in FIG. 3 may invoke application program code stored in the memory 402, to instruct the network device to perform the actions of the terminal device in operations S1101 to S1105. This is not limited in an embodiment.

For example, when DCI is used to schedule a plurality of TBs, an embodiment of this application may further provide a plurality of discontinuous transmission indication methods.

In an embodiment, a network device may explicitly indicate continuous transmission or discontinuous transmission by using indication information. For example, the network device sends the indication information to a terminal device, where the indication information is used to indicate that the plurality of TBs scheduled by using the DCI are discontinuously transmitted. Therefore, the terminal device receives the indication information, and determines, based on the indication information, that the plurality of TBs scheduled by using the DCI are discontinuously transmitted.

In an embodiment of the application, continuous transmission indicates that there is no scheduling interval between a transmission end time corresponding to a previous TB in the plurality of TBs scheduled by using the DCI and a transmission start time corresponding to a next TB, and discontinuous transmission indicates that there is a scheduling interval between a transmission end time corresponding to a previous TB in the plurality of TBs scheduled by using the DCI and a transmission start time corresponding to a next TB. A general description is provided herein, and details are not described below.

In an embodiment, the indication information may be carried in the DCI, radio resource control (radio resource control, RRC) signaling, or a media access control (MAC) message (for example, a media access control control element (MAC control element, MAC CE)). This is not limited in an embodiment of the application.

For example, the indication information may occupy one bit. For example, "0" indicates continuous transmission, and "1" indicates discontinuous transmission. Alternatively, "1" indicates continuous transmission, and "0" indicates discontinuous transmission. This is not limited herein.

In an embodiment, the network device may implicitly indicate continuous transmission or discontinuous transmission.

Manner 1: Continuous transmission or discontinuous transmission is distinguished by using a transport block size (TB size, TBS) scheduled by using the DCI. For example, two TBs are scheduled by using the DCI. If the TBS scheduled by using the DCI is less than TBSmax/2, it may indicate that current scheduling is continuous transmission; if the TBS scheduled by using the DCI is greater than or equal to TBSmax/2, it may indicate that current scheduling is discontinuous transmission. TBSmax is a maximum TBS supported by the terminal device.

Manner 2: Continuous transmission or discontinuous transmission is distinguished by using an MCS field in the DCI. For example, two TBs are scheduled by using the DCI. If $0 \leq I_{MCS} \leq 7$, it may indicate that current scheduling is continuous transmission; if $I_{MCS} > 7$, it may indicate that current scheduling is discontinuous transmission. $I_{MCS}$ is a value indicated by the MCS field in the DCI.

Manner 3: Continuous transmission or discontinuous transmission is distinguished by using a resource assignment field in the DCI. For example, two TBs are scheduled by using the DCI. For downlink transmission, if $0 \leq I_{SF} \leq 3$, it may indicate that current scheduling is continuous transmission; if $I_{SF} > 3$, it may indicate that current scheduling is discontinuous transmission. Alternatively, for uplink transmission, if $0 \leq I_{RU} \leq 3$, it may indicate that current scheduling is continuous transmission; if $I_{RU} > 3$, it may indicate that current scheduling is discontinuous transmission. $I_{SF}$ is a value that is used for downlink scheduling and that is indicated by the resource assignment field in the DCI. $I_{RU}$ is a value that is used for uplink scheduling and that is indicated by the resource assignment field in the DCI.

It should be noted that the discontinuous transmission indication methods provided in an embodiment of the application may be applied to the communication method shown in FIG. 5, FIG. 8, or FIG. 11. In other words, in the foregoing communication method, if the DCI is used to schedule a plurality of TBs, the discontinuous transmission indication methods provided in an embodiment of the application may be used to indicate that the plurality of TBs scheduled by using the DCI are discontinuously transmitted. Certainly, the discontinuous transmission indication methods provided in an embodiment of the application may also be applied to another scenario. A general description is provided herein, and details are not described below.

It may be understood that, in the foregoing embodiments, methods and/or operations implemented by the terminal device may also be implemented by a component (for example, a chip or a circuit) that can be used in the terminal device, and methods and/or operations implemented by the network device may also be implemented by a component that can be used in the network device.

The foregoing mainly describes the solutions provided in the embodiments of this application from a perspective of interaction between the network elements. Correspondingly, an embodiment of this application further provides a communication apparatus, and the communication apparatus is configured to implement the foregoing methods. The communication apparatus may be the terminal device in the foregoing method embodiments, or an apparatus including the foregoing terminal device, or a component that can be used in the terminal device. Alternatively, the communication apparatus may be the network device in the foregoing method embodiments, or an apparatus including the foregoing network device, or a component that can be used in the network device. It may be understood that, to implement the foregoing functions, the communication apparatus includes a corresponding hardware structure and/or software module for performing each function. One of ordinary skilled in the art should easily be aware that, in combination with the units and algorithm operations in the examples described in the embodiments disclosed in this specification, this application can be implemented by hardware or a combination of hardware and computer software. Whether a function is performed by hardware or hardware driven by computer software depends on particular applications and design constraints of the technical solutions. One of ordinary skilled in the art may use different methods to implement the described functions for each particular application, but it should not be considered that such an embodiment goes beyond the scope of this application.

In the embodiments of this application, the communication apparatus may be divided into function modules based on the foregoing method embodiments. For example, each function module may be obtained through division based on each corresponding function, or two or more functions may be integrated into one processing module. The integrated module may be implemented in a form of hardware, or may be implemented in a form of a software function module. It should be noted that in the embodiments of this application, division into the modules is an example and is merely logical function division, and may be other division during actual embodiment.

Figure 14:
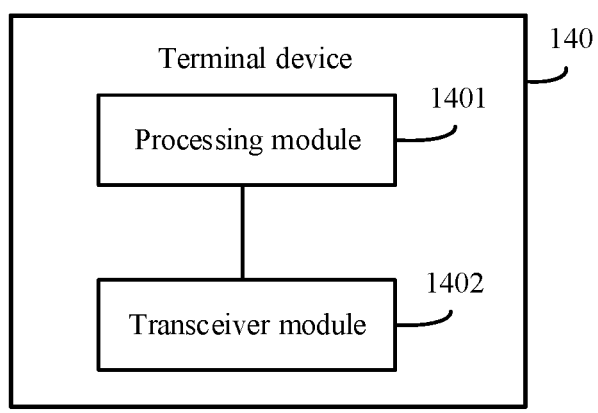
FIG. 14 is still another schematic structural diagram of a terminal device according to an embodiment of this application.

For example, the communication apparatus is the terminal device in the foregoing method embodiments. FIG. 14 is a schematic structural diagram of a terminal device 140. The terminal device 140 includes a processing module 1401 and a transceiver module 1402. The transceiver module 1402 may also be referred to as a transceiver unit, and is configured to implement a sending and/or receiving function, for example, may be a transceiver circuit, a transceiver machine, a transceiver, or a communication interface.

The processing module 1401 is configured to receive, through the transceiver module 1402, first DCI from a network device, where the first DCI includes a first field and a second field, the first field is used to indicate that a retransmitted TB exists in a TB scheduled by using the first DCI, and the second field is used to indicate an index of a retransmitted first TB in the TB scheduled by using the first DCI; and the processing module 1401 is further configured to receive, through the transceiver module 1402, the retransmitted first TB from the network device based on the first field and the second field; or the processing module 1401 is further configured to send, through the transceiver module 1402, the retransmitted first TB to the network device based on the first field and the second field.

In an embodiment, the processing module 1401 is further configured to: if a buffer of the terminal device stores data of a second TB, replace the data of the second TB in the buffer with data of the first TB.

In an embodiment, the processing module 1401 is further configured to receive, through the transceiver module 1402, second DCI from the network device, where the second DCI is used to schedule the initially transmitted first TB and the initially transmitted second TB; the processing module 1401 is further configured to receive, through the transceiver module 1402, the initially transmitted second TB from the network device based on the second DCI; and the processing module 1401 is further configured to send, through the transceiver module 1402, a NACK of the initially transmitted second TB to the network device.

In an embodiment, the processing module 1401 is further configured to receive, through the transceiver module 1402, second DCI from the network device, where the second DCI is used to schedule the initially transmitted first TB and the initially transmitted second TB; the processing module 1401 is further configured to send, through the transceiver module 1402, the initially transmitted first TB to the network device based on the second DCI; and the processing module 1401 is further configured to: if the processing module 1401 receives, through the transceiver module 1402, no DCI within first specified duration, send, through the transceiver module 1402, the initially transmitted second TB to the network device based on the second DCI.

In an embodiment, the processing module 1401 is further configured to receive, through the transceiver module 1402, indication information from the network device, where the indication information is used to indicate that a plurality of TBs scheduled by using DCI are discontinuously transmitted; and the processing module 1401 is further configured to determine, based on the indication information, that the initially transmitted first TB and the initially transmitted second TB are discontinuously transmitted.

In an embodiment, the processing module 1401 is further configured to determine, based on a TBS of the initially transmitted first TB or the initially transmitted second TB, that the initially transmitted first TB and the initially transmitted second TB are discontinuously transmitted; the processing module 1401 is further configured to determine, based on an MCS field in the second DCI, that the initially transmitted first TB and the initially transmitted second TB are discontinuously transmitted; or the processing module 1401 is further configured to determine, based on a resource assignment field in the second DCI, that the initially transmitted first TB and the initially transmitted second TB are discontinuously transmitted.

All related content of the operations in the foregoing method embodiments may be cited in function descriptions of a corresponding function module, and details are not described herein again.

In an embodiment, the terminal device 140 is presented in a form of function modules obtained through division in an integrated manner. The "module" herein may be an ASIC, a circuit, a processor and a memory that execute one or more software or firmware programs, an integrated logic circuit, and/or another component that can provide the foregoing functions. In a simple embodiment, one of ordinary skilled in the art may figure out that the terminal device 140 may be in a form of the terminal device 40 shown in FIG. 3.

For example, the processor 401 in the terminal device 40 shown in FIG. 3 may invoke computer-executable instructions stored in the memory 402, to enable the terminal device 40 to perform the communication methods in the foregoing method embodiments.

For example, functions/implementation processes of the processing module 1401 and the transceiver module 1402 in FIG. 11 may be implemented by the processor 401 in the terminal device 40 shown in FIG. 3 by invoking the computer-executable instructions stored in the memory 402. Alternatively, functions/implementation processes of the processing module 1401 in FIG. 11 may be implemented by the processor 401 in the terminal device 40 shown in FIG. 3 by invoking computer-executable instructions stored in the memory 402, and functions/implementation processes of the transceiver module 1402 in FIG. 11 may be implemented by the transceiver 403 in the terminal device 40 shown in FIG. 3.

Because the terminal device 140 provided in an embodiment may perform the foregoing communication methods, for a technical effect that can be achieved by the terminal device 140, refer to the foregoing method embodiments. Details are not described herein again.

Figure 15:
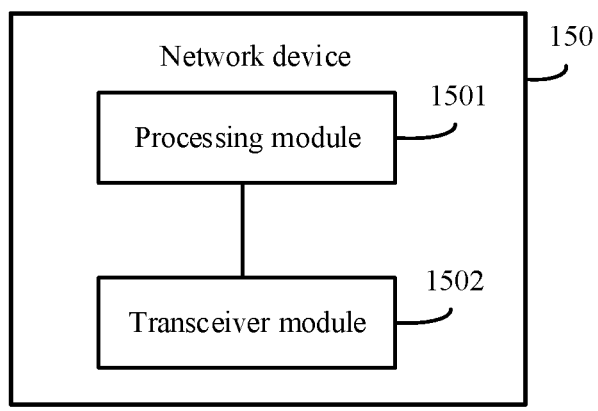
FIG. 15 is another schematic structural diagram of a network device according to an embodiment of this application.

Alternatively, for example, the communication apparatus is the network device in the foregoing method embodiments. FIG. 15 is a schematic structural diagram of a network device 150. The network device 150 includes a processing module 1501 and a transceiver module 1502. The transceiver module 1502 may also be referred to as a transceiver unit, and is configured to implement a sending and/or receiving function, for example, may be a transceiver circuit, a transceiver machine, a transceiver, or a communication interface.

The processing module 1501 is configured to send, through the transceiver module 1502, first DCI to a terminal device, where the first DCI includes a first field and a second field, the first field is used to indicate that a retransmitted TB exists in a TB scheduled by using the first DCI, and the second field is used to indicate an index of a retransmitted first TB in the TB scheduled by using the first DCI; and the processing module 1501 is further configured to send, through the transceiver module 1502, the first TB to the terminal device; or the processing module 1501 is further configured to receive, through the transceiver module 1502, the first TB from the terminal device.

In an embodiment, the first DCI is used for downlink scheduling; the processing module 1501 is further configured to send, through the transceiver module 1502, second DCI to the terminal device, where the second DCI is used to schedule the initially transmitted first TB and an initially transmitted second TB; the processing module 1501 is further configured to send, through the transceiver module 1502, the initially transmitted second TB to the terminal device; and the processing module 1501 is further configured to receive, through the transceiver module 1502, a NACK of the initially transmitted second TB from the terminal device.

Alternatively, In an embodiment, the first DCI is used for uplink scheduling; the processing module 1501 is further configured to send, through the transceiver module 1502, second DCI to the terminal device, where the second DCI is used to schedule the initially transmitted first TB and an initially transmitted second TB; the processing module 1501 is further configured to receive, through the transceiver module 1502, the initially transmitted first TB from the terminal device; and the processing module 1501 is further configured to: if the processing module 1501 sends, through the transceiver module 1502, no DCI to the terminal device within first specified duration, receive, through the transceiver module 1502, the initially transmitted second TB from the terminal device.

In an embodiment, the processing module 1501 is further configured to send, through the transceiver module 1502, indication information to the terminal device, where the indication information is used to indicate that a plurality of TBs scheduled by using DCI are discontinuously transmitted.

Alternatively, in an embodiment, a TBS of the initially transmitted first TB or the initially transmitted second TB is used to determine that the initially transmitted first TB and the initially transmitted second TB are discontinuously transmitted. Alternatively, an MCS field in the second DCI is used to determine that the initially transmitted first TB and the initially transmitted second TB are discontinuously transmitted. Alternatively, a resource assignment field in the second DCI is used to determine that the initially transmitted first TB and the initially transmitted second TB are discontinuously transmitted.

All related content of the operations in the foregoing method embodiments may be cited in function descriptions of a corresponding function module, and details are not described herein again.

In an embodiment, the network device 150 is presented in a form of function modules obtained through division in an integrated manner. The "module" herein may be an ASIC, a circuit, a processor and a memory that execute one or more software or firmware programs, an integrated logic circuit, and/or another component that can provide the foregoing functions. In a simple embodiment, one of ordinary skilled in the art may figure out that the network device 150 may be in a form of the network device 30 shown in FIG. 3.

For example, the processor 301 in the network device 30 shown in FIG. 3 may invoke computer-executable instructions stored in the memory 302, to enable the network device 30 to perform the communication methods in the foregoing method embodiments.

For example, functions/implementation processes of the processing module 1501 and the transceiver module 1502 in FIG. 15 may be implemented by the processor 301 in the network device 30 shown in FIG. 3 by invoking the computer-executable instructions stored in the memory 302. Alternatively, functions/implementation processes of the processing module 1501 in FIG. 15 may be implemented by the processor 301 in the network device 30 shown in FIG. 3 by invoking computer-executable instructions stored in the memory 302, and functions/implementation processes of the transceiver module 1502 in FIG. 15 may be implemented by the transceiver 303 in the network device 30 shown in FIG. 3.

Because the network device 150 provided in an embodiment may perform the foregoing communication methods, for a technical effect that can be achieved by the network device 150, refer to the foregoing method embodiments. Details are not described herein again.

In an embodiment, an embodiment of this application further provides a communication apparatus (where for example, the communication apparatus may be a chip or a chip system). The communication apparatus includes a processor, configured to implement the method in any one of the foregoing method embodiments. In an embodiment, the communication apparatus further includes a memory. The memory is configured to store necessary program instructions and necessary data. The processor may invoke program code stored in the memory, to instruct the communication apparatus to perform the method in any one of the foregoing method embodiments. Certainly, the memory may alternatively not be in the communication apparatus. When the communication apparatus is a chip system, the communication apparatus may include a chip, or may include a chip and another discrete component. This is not limited in an embodiment of the application.

All or some of the foregoing embodiments may be implemented by software, hardware, firmware, or any combination thereof. When a software program is used to implement the embodiments, the embodiments may be implemented completely or partially in a form of a computer program product. The computer program product includes one or more computer instructions. When computer program instructions are loaded and executed on a computer, the procedure or functions according to the embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like. In the embodiments of this application, the computer may include the apparatuses described above.

Although this application is described with reference to the embodiments, in a process of implementing this application that claims protection, one of ordinary skilled in the art may understand and implement another variation of the disclosed embodiments by viewing the accompanying drawings, disclosed content, and the appended claims. In the claims, "comprising" does not exclude another component or another operation, and "a" or "one" does not exclude a case of "a plurality of". A single processor or another unit may implement several functions enumerated in the claims. Some measures are recorded in dependent claims that are different from each other, but this does not mean that these measures cannot be combined to produce a better effect.

Although this application is described with reference to features and the embodiments thereof, it is clear that various modifications and combinations may be made to this application without departing from the spirit and scope of this application. Correspondingly, the specification and accompanying drawings are merely example descriptions of this application defined by the appended claims, and are considered as any of or all modifications, variations, combinations or equivalents that cover the scope of this application. Clearly, one of ordinary skilled in the art can make various modifications and variations to this application without departing from the spirit and scope of this application. In this way, this application is intended to cover these modifications and variations of this application provided that they fall within the scope of the claims of this application and equivalent technologies thereof.

What is claimed is:

1. A communication method, comprising:
   receiving, by a terminal device, first downlink control information (DCI) from a network device, wherein the first DCI comprises a first field and a second field, the first field indicating that a retransmitted transport block (TB) exists in one or more TBs scheduled by using the first DCI, and the second field indicating an index of a retransmitted first TB in the one or more TBs scheduled by using the first DCI, wherein before the receiving the first DCI from the network device, the terminal device receives second DCI used to schedule an initially transmitted first TB and an initially transmitted second TB; and
   receiving, by the terminal device, the retransmitted first TB from the network device based on the first field and the second field; or sending, by the terminal device, the retransmitted first TB to the network device based on the first field and the second field.

2. The method according to claim 1, wherein after the receiving the retransmitted first TB from the network device, the method further comprises:
   if a buffer of the terminal device stores data of athe initially transmitted second TB, replacing, by the terminal device, data of the initially transmitted second TB in the buffer with data of the retransmitted first TB.

3. The method according to claim 1, wherein before the receiving the first DCI from the network device, the method further comprises:
   receiving, by the terminal device, the second DCI from the network device;
   receiving, by the terminal device, the initially transmitted second TB from the network device based on the second DCI; and
   sending, by the terminal device, a negative acknowledgement (NACK) of the initially transmitted second TB to the network device.

4. The method according to claim 1, wherein before the receiving the first DCI from the network device, the method further comprises:
   receiving, by the terminal device, the second DCI from the network device, wherein the second DCI is used to schedule the initially transmitted first TB and the initially transmitted second TB;
   sending, by the terminal device, the initially transmitted first TB to the network device based on the second DCI; and
   if the terminal device receives no DCI within first specified duration, sending, by the terminal device, the initially transmitted second TB to the network device based on the second DCI.

5. The method according to claim 3, further comprising:
   receiving, by the terminal device, indication information from the network device, wherein the indication information indicates that a plurality of TBs scheduled by using DCI are discontinuously transmitted; and
   determining, by the terminal device based on the indication information, that the initially transmitted first TB and the initially transmitted second TB are discontinuously transmitted.

6. The method according to claim 3, wherein after the receiving second DCI from the network device, the method further comprises:
   determining, by the terminal device based on a transport block size (TBS) of the initially transmitted first TB or the initially transmitted second TB, that the initially transmitted first TB and the initially transmitted second TB are discontinuously transmitted;
   determining, by the terminal device based on a modulation and coding scheme MCS field in the second DCI, that the initially transmitted first TB and the initially transmitted second TB are discontinuously transmitted; or
   determining, by the terminal device based on a resource assignment field in the second DCI, that the initially transmitted first TB and the initially transmitted second TB are discontinuously transmitted.

7. The method according to claim 6, further comprising:
   sending, by the network device, indication information to the terminal device, wherein the indication information indicates that a plurality of TBs scheduled by using DCI are discontinuously transmitted.

8. The method according to claim 6, wherein a transport block size TBS of the initially transmitted first TB or the initially transmitted second TB is used to determine that the initially transmitted first TB and the initially transmitted second TB are discontinuously transmitted;
   the modulation and coding scheme MCS field in the second DCI is used to determine that the initially transmitted first TB and the initially transmitted second TB are discontinuously transmitted; or
   the resource assignment field in the second DCI is used to determine that the initially transmitted first TB and the initially transmitted second TB are discontinuously transmitted.

9. A communication method, comprising:
   sending, by a network device, first downlink control information (DCI) to a terminal device, wherein the first DCI comprises a first field and a second field, the first field indicating that a retransmitted transport block (TB) exists in one or more TBs scheduled by using the first DCI, and the second field indicating an index of a retransmitted first TB in the one or more TBs scheduled by using the first DCI, wherein before the receiving the first DCI from the network device, the terminal device receives second DCI used to schedule an initially transmitted first TB and an initially transmitted second TB; and sending, by the network device, the first TB to the terminal device; or receiving, by the network device, the first TB from the terminal device.

10. The method according to claim 9, wherein the first DCI is used for downlink scheduling, and before the sending the first DCI to the terminal device, the method further comprises:

sending, by the network device, the second DCI to the terminal device;

sending, by the network device, the initially transmitted second TB to the terminal device; and receiving, by the network device, a negative acknowledgement NACK of the initially transmitted second TB from the terminal device.

11. A communication apparatus, wherein the communication apparatus comprises:

a processor; and a memory coupled to the processor to store instructions, which when executed by the processor, cause the processor to;

send first downlink control information DCI to a terminal device, wherein the first DCI comprises a first field and a second field, the first field is used to indicate that a retransmitted TB exists in one or more TBs scheduled by using the first DCI, and the second field is used to indicate an index of a retransmitted first TB in the one or more TBs scheduled by using the first DCI, wherein before the sending the first DCI to the terminal device, the processor sends second DCI used to schedule an initially transmitted first TB and an initially transmitted second TB; and send the first TB to the terminal device; or receive the first TB from the terminal device.

12. The communication apparatus according to claim 11, wherein the first DCI is used for downlink scheduling;

the processor is further configured to:

send the second DCI to the terminal device;

send the initially transmitted second TB to the terminal device; and receive a negative acknowledgement NACK of the initially transmitted second TB from the terminal device.

13. The communication apparatus according to claim 12, wherein the first DCI is used for uplink scheduling;

the processor is further configured to:

send the second DCI to the terminal device;

receive the initially transmitted first TB from the terminal device; and if the processor sends no DCI to the terminal device within first specified duration, receive the initially transmitted second TB from the terminal device.

14. The communication apparatus according to claim 13, wherein redundancy versions corresponding to the initially transmitted first TB and the initially transmitted second TB are specified first redundancy versions.

15. The communication apparatus according to claim 11, wherein the first DCI further comprises a third field, and the third field is used to indicate a second redundancy version corresponding to the retransmitted first TB.

16. The communication apparatus according to claim 15, wherein redundancy versions corresponding to the initially transmitted first TB and the initially transmitted second TB are specified first redundancy versions; and a redundancy version corresponding to the retransmitted first TB is a specified second redundancy version, wherein the first redundancy version is different from the second redundancy version.

17. The communication apparatus according to claim 12, wherein the terminal device is further configured to:

receive indication information from the communication apparatus, wherein the indication information indicates that a plurality of TBs scheduled by using DCI are discontinuously transmitted; and determine, based on the indication information, that the initially transmitted first TB and the initially transmitted second TB are discontinuously transmitted.

18. The communication apparatus according to claim 14, wherein the processor is further configured to:

determine, based on a transport block size TBS of the initially transmitted first TB or the initially transmitted second TB, that the initially transmitted first TB and the initially transmitted second TB are discontinuously transmitted;

determine, based on a modulation and coding scheme MCS field in the second DCI, that the initially transmitted first TB and the initially transmitted second TB are discontinuously transmitted; or determine, based on a resource assignment field in the second DCI, that the initially transmitted first TB and the initially transmitted second TB are discontinuously transmitted.

19. The communication apparatus according to claim 14, wherein the processor is further configured to:

send indication information to the terminal device, wherein the indication information indicates that a plurality of TBs scheduled by using DCI are discontinuously transmitted.

20. The communication apparatus according to claim 14, wherein a transport block size TBS of the initially transmitted first TB or the initially transmitted second TB is used to determine that the initially transmitted first TB and the initially transmitted second TB are discontinuously transmitted;

a modulation and coding scheme MCS field in the second DCI is used to determine that the initially transmitted first TB and the initially transmitted second TB are discontinuously transmitted; or a resource assignment field in the second DCI is used to determine that the initially transmitted first TB and the initially transmitted second TB are discontinuously transmitted.

* * * * *

UNITED STATES PATENT AND TRADEMARK OFFICE
CERTIFICATE OF CORRECTION

Page 1 of 1

PATENT NO. : 12,143,999 B2
APPLICATION NO. : 17/401839
DATED : November 12, 2024
INVENTOR(S) : Zhihu Luo et al.

It is certified that error appears in the above-identified patent and that said Letters Patent is hereby corrected as shown below:

In the Claims

In Column 35, Claim 2, Line 56, delete "stores data of athe" and insert --stores data of the--.

Signed and Sealed this
Eleventh Day of February, 2025

Coke Morgan Stewart
*Acting Director of the United States Patent and Trademark Office*